(12) United States Patent
Takatori et al.

(10) Patent No.: US 10,584,688 B2
(45) Date of Patent: Mar. 10, 2020

(54) MANIPULATION OF FLEXIBLE MATERIALS THROUGH SELF-PROPELLED BODIES

(71) Applicant: CALIFORNIA INSTITUTE OF TECHNOLOGY, Pasadena, CA (US)

(72) Inventors: Sho C. Takatori, Pasadena, CA (US); John F. Brady, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 629 days.

(21) Appl. No.: 14/742,635

(22) Filed: Jun. 17, 2015

(65) Prior Publication Data

US 2015/0369220 A1 Dec. 24, 2015

Related U.S. Application Data

(60) Provisional application No. 62/014,612, filed on Jun. 19, 2014.

(51) Int. Cl.
*F03G 7/00* (2006.01)

(52) U.S. Cl.
CPC .................................... *F03G 7/00* (2013.01)

(58) Field of Classification Search
None
See application file for complete search history.

(56) References Cited

U.S. PATENT DOCUMENTS

2013/0296631 A1* 11/2013 Weinberg ........... A61B 17/3207
600/12

FOREIGN PATENT DOCUMENTS

WO  WO-2010099552 A2 * 9/2010 ........ A61M 37/0092

OTHER PUBLICATIONS

Croze, Ottavio A., et al. "Migration of chemotactic bacteria in soft agar: role of gel concentration." Biophysical journal 101.3 (2011): 525-534. (Year: 2011).*
Wolfe, Alan J., and Howard C. Berg. "Migration of bacteria in semisolid agar." Proceedings of the National Academy of Sciences 86.18 (1989): 6973-6977. (Year: 1989).*
Kim, Dongwook, et al. "Chemotactic steering of bacteria propelled microbeads." Biomedical microdevices 14.6 (2012): 1009-1017. Year: 2012).*
Martel, Sylvain, et al. "Flagellated magnetotactic bacteria as controlled MRI-trackable propulsion and steering systems for medical nanorobots operating in the human microvasculature." The International journal of robotics research 28.4 (2009): 571-582. (Year: 2009).*
Afkhami, Fatemeh, et al. "Encapsulation of magnetotactic bacteria for targeted and controlled delivery of anticancer agents for tumor therapy." Engineering in Medicine and Biology Society, EMBC, 2011 Annual International Conference of the IEEE. IEEE, 2011. (Year: 2011).*
Atencia, Javier, Jayne Morrow, and Laurie E. Locascio. "The microfluidic palette: a diffusive gradient generator with spatio-temporal control." Lab on a Chip 9.18 (2009): 2707-2714. (Year: 2009).*
Brett, Marie-Elena, et al. "A microfluidic device that forms and redirects pheromone gradients to study chemotropism in yeast." Lab on a chip 12.17 (2012): 3127-3134. (Year: 2012).*
Vitkova, Victoria, M. Mader, and Thomas Podgorski. "Deformation of vesicles flowing through capillaries." EPL (Europhysics Letters) 68.3 (2004): 398. (Year: 2004).*
Wang, M. D et al., "Force Velocity Measured for Single Molecules of RNA Polymerase", vol. 282, pp. 902-907 Oct. 1998.
Svoboda, K. et al., "Direct observation of kinesin stepping by optical trapping interferometry", Nature, vol. 365, pp. 721-727 Oct. 1993.
Takatori, S. C et al., "Motion of active swimmers in an acoustic trap", Acoustic6, vol. 15:47, pp. 1-7, Jun. 2015.
Brenner, H. et al., "Transport Mechanics in Systems of Orientable Particles" Convective Transport, Journal of Colloid and Interface Science, vol. 47, No. 1, Apr. 1974.
S. Ramaswamy, "The Mechanics and Statistics of Active Matter" Annu. Rev. Condens. Matter Phys., 2010, 1, pp. 323-345.
S. C. Takatori, W. Yan and J. F. Brady, "Swim Pressure: Stress Generation in Active Matter" Phys. Rev. Lett., 2014, 113, pp. 028103-1-028103-5.
J. Adler, "Chemtaxis in Bacteria" Science, 1966, 153, pp. 708-716.
J. Armitage and K. Hellingwerf, "Light-induced behavioral responses ('phototaxis') in prokaryotes" Photosynth. Res., 2003, 76, pp. 145-155.
R. Blakemore, "Magnetotactic Bacteria" Science, 1975, 190, pp. 377-379.
D. S. Fudge, T. Winegard, R. H. Ewoldt, D. Beriault,L. Szewciw and G. H. McKinley "From ultra-soft slime to hard α-keratins: The many lives of intermediate filaments", Integr. Comp. Biol., 2009,49, pp. 32-39.
S. K. Lai, Y.-Y. Wang, D. Wirtz and J. Hanes "Micro- and macrorheology of mucus" , Adv. Drug Delivery Rev., 2009, 61, pp. 86-100.
D. Saintillan and M. J. Shelley "Instabilities, patter formation, and mixing in action suspensions", Phys. Fluids, 2008, 20, pp. 123304-123315.
T. Ishikawa, M. P. Simmonds and T. J. Pedley, "Hydrodynamic interaction of two swimming model micro-organisms" J. Fluid Mech., 2006, 568, pp. 119-160.
I. Theurkauff, C. Cottin-Bizonne, J. Palacci, C. Ybert and L. Bocquet, "Dynamic Clustering in Active Colloidal Suspensions with Chemical Signaling" Phys. Rev. Lett., 2012, 108, p. 268303-1-268303-5.

(Continued)

*Primary Examiner* — Robert J Yamasaki
(74) *Attorney, Agent, or Firm* — Steinfl + Bruno, LLP

(57) ABSTRACT

A system is described comprising self-propelled bodies such as bacteria or nanoparticles, which can be activated with an external field to move in a desired direction. The self-propelled bodies, or swimmers, are contained in a flexible membrane which is mechanically manipulated through the movement of the swimmers. By controlling the applied field, which can be magnetic, chemical or gravitational, the flexible membranes can be translated and/or deformed.

4 Claims, 15 Drawing Sheets

(56) References Cited

OTHER PUBLICATIONS

J. Palacci, S. Sacanna, A. P. Steinberg, D. J. Pine and P. M. Chaikin," Living Crystals of Light-Activated Colloidal Surfers" Science, 2013, 339, pp. 936-940.
H. Brenner, J. Colloid Interface "Taylor Dispersion in Systems of Sedimenting Nonspherical Brownian Particles"Sci., 1979, 71, pp. 189-208.
Y. Almog and I. Frankel, "Effects of Fore-Aft Asymmetry on the Sedimentation and Dispersion of Axisymmetric Brownian Particles" J. Colloid Interface Sci., 1993, 157, pp. 60-71.
M. A. Bees, N. A. Hill and T. J. Pedley, "Analytical approximations for the orientation distribution of small dipolar particles in steady shear flows" J. Math. Biol., 1998, 36, pp. 269-298.
A. Manela and I. Frankel, "Generalized Taylor dispersion in suspensions of gyrotactic swimming microorganisms" J. Fluid Mech., 2003, 490, pp. 99-127.
T. J. Pedley and J. O. Kessler, "A new continuum model for suspensions of gyrotactic micro-organism" J. Fluid Mech., 1990, 212, pp. 155-182.
R. N. Bearon, A. L. Hazel and G. J. Thorn, "The spatial distribution of gyrotactic swimming micro-organisms in laminar flow fields" J. Fluid Mech., 2011, 680, pp. 602-635.
R. N. Bearon, M. A. Bees and O. A. Croze, "Biased swimming cells do not disperse in pipes as tracers: A population model based on microscale behavior" Phys. Fluids, 2012, 24, pp. 121902-2-121902-20.
M. Demir and H. Salman, "Bacterial Thermotaxis by Speed Modulation" Biophys. J., 2012, 103, pp. 1683-1690.
R. R. Vuppula, M. S. Tirumkudulu and K. V. Venkatesh," Chemotaxis of *Escherichia coli to L-serine*" Phys.Biol., 2010, 7, 026007, pp. 1-9.
R. N. Zia and J. F. Brady, "Single-particle motion in colloids: force-induced diffusion" J. Fluid Mech., 2010, 658, pp. 188-210.
U. M. Cordova-Figueroa and J. F. Brady, "Osmotic Propulsion: The Osmotic Motor" Phys. Rev. Lett., 2008,100, pp. 158303-1-15803-4.
H. Brenner and D. Edwards, "Transport Mechanics in Systems of Orientable Particles" Macrotransport Processes, Butterworth-Heinemann Limited, 1993.
H. Brenner and D. W. Condiff, "The Stokes resistance of an arbitrary particle-III" J. Colloid Interface Sci., 1974, 47, pp. 199-264.
D. A. Beard and T. Schlick, "Unbiased Rotational Moves for Rigid-Body Dynamics" Biophys. J., 2003, 85, pp. 2973-2976.
J. Toner, Y. Tu and S. Ramaswamy, "Hydrodynamics and phases of flocks" Ann. Phys., 2005, 318, pp. 170-244.
A. Snezhko and I. S. Aranson, "Magnetic manipulation of self-assembled colloidal asters" Nat. Mater., 2011, 10, pp. 698-703.
M. V. Sapozhnikov, Y. V. Tolmachev, I. S. Aranson and W. K. Kwok, "Dynamic Self-Assembly and Patterns in Electrostatically Driven Granular Media" Phys. Rev. Lett., 2003, 90, pp. 114301-1-114301-4.
M. E. Leunissen, H. R. Vutukuri and A. van Blaaderen, "Directing Colloidal Self-Assembly with Biaxial Electric Fields" Adv. Mater., 2009, 21, pp. 3116-3120.
Takatori, S. C & Brady, J. F. (2014) "Swim stress, motion, and deformation of active matter: effect of an external field. Soft Matter 10," pp. 9433-9445.
Takatori, S. C & Brady, J. F. (2015) "Towards a thermodynamics of active matter". Phys Rev E 91, pp. 032117-1-032117-7.
Fily, Y, Henkes, S, & Marchetti, M. C. (2014) "Freezing and phase separation of self-propelled disks." Soft Matter 10, pp. 2132-2140.
Solon, A. P, Stenhammar, J, Wittkowski, R, Kardar, M, Kafri, Y, Cates, M. E, & Tailleur, J. (2015) "Pressure and phase equilibria in interacting active Brownian spheres". Phys Rev Lett 114, pp. 198301-1-198301-6.
Mallory, S. A, Saric, A, Valeriani, C, & Cacciuto, A. (2014) "Anomalous thermomechanical properties of a self-propelled colloidal fluid." Phys Rev E 89, pp. 052303-1-052303-7.
Ginot, F, Theurkauff, I, Levis, D, Ybert, C, Bocquet, L, Berthier, L, & Cottin-Bizonne, C. (2015) "Nonequilibrium equation of state in suspensions of active colloids." Phys Rev X 5, pp. 011004-1-011004-8.
Wang, Z, Chen, H.-Y, Sheng, Y.-J, & Tsao, H.-K. (2014) "Diffusion, sedimentation equilibrium, and harmonic trapping of run-and-tumble nanoswimmers." Soft Matter 10, pp. 3209-3217.
Nash, R. W, Adhikari, R, Tailleur, J, & Cates, M. E. (2010) "Run-and-tumble particles with hydrodynamics: Sedimentation, trapping, and upstream swimming." Phys Rev Lett 104, pp. 258101-1-258101-4.
Tailleur, J & Cates, M. E. (2009) "Sedimentation, trapping, and rectification of dilute bacteria." Europhys Lett 86, 60002-p1-60002-p6.
Chattopadhyay, S, Moldovan, R, Yeung, C, & Wu, X. L. (2006) "Swimming efficiency of bacterium *Escherichia coli*." Proc Natl Acad Sci U.S.A 103, 13712-13717.
Howse, J. R, Jones, R. A. L, Ryan, A. J, Gough, T, Vafabakhsh, R, & Golestanian, R. (2007) "Self-motile colloidal particles: from directed propulsion to random walk." Phys Rev Lett 99, pp. 048102-1-048102-4.
Lee, J, Teh, S.-Y, Lee, A, Kim, H. H, Lee, C, & Shung, K. K. (2010) "Transverse acoustic trapping using a Gaussian focused ultrasound." Ultrasound Med Biol 36, pp. 350-355.
Crocker, J. C & Grier, D. G. (1996) Methods of digital video microscopy for colloidal studies. J Colloid Interface Sci 179, 298-310.
Foss, D. R & Brady, J. F. (2000) "Brownian dynamics simulation of hard-sphere colloidal dispersions." J Rheol 44, pp. 629-651.
Heyes, D. M & Melrose, J. R. (1993) "Brownian dynamics simulations of model hardsphere suspensions." J Non-Newtonian Fluid Mech 46, pp. 1-28.
Brenner H. et al., "The Stokes resistance of an arbitrary particle-III" Chem. Eng. Sci., 1964, vol. 19, pp. 631-651.

\* cited by examiner

MANIPULATION OF FLEXIBLE MATERIALS THROUGH SELF-PROPELLED BODIES

CROSS REFERENCE TO RELATED APPLICATIONS

The present application claims priority to U.S. Provisional Patent Application No. 62/014,612, filed on Jun. 19, 2014, the disclosure of which is incorporated herein by reference in its entirety.

STATEMENT OF INTEREST

This invention was made with government support under DGE1144469 awarded by the National Science Foundation. The government has certain rights in the invention.

TECHNICAL FIELD

The present disclosure relates to synthetic and biological self-propelled bodies. More particularly, it relates to the manipulation of flexible materials through self-propelled bodies.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
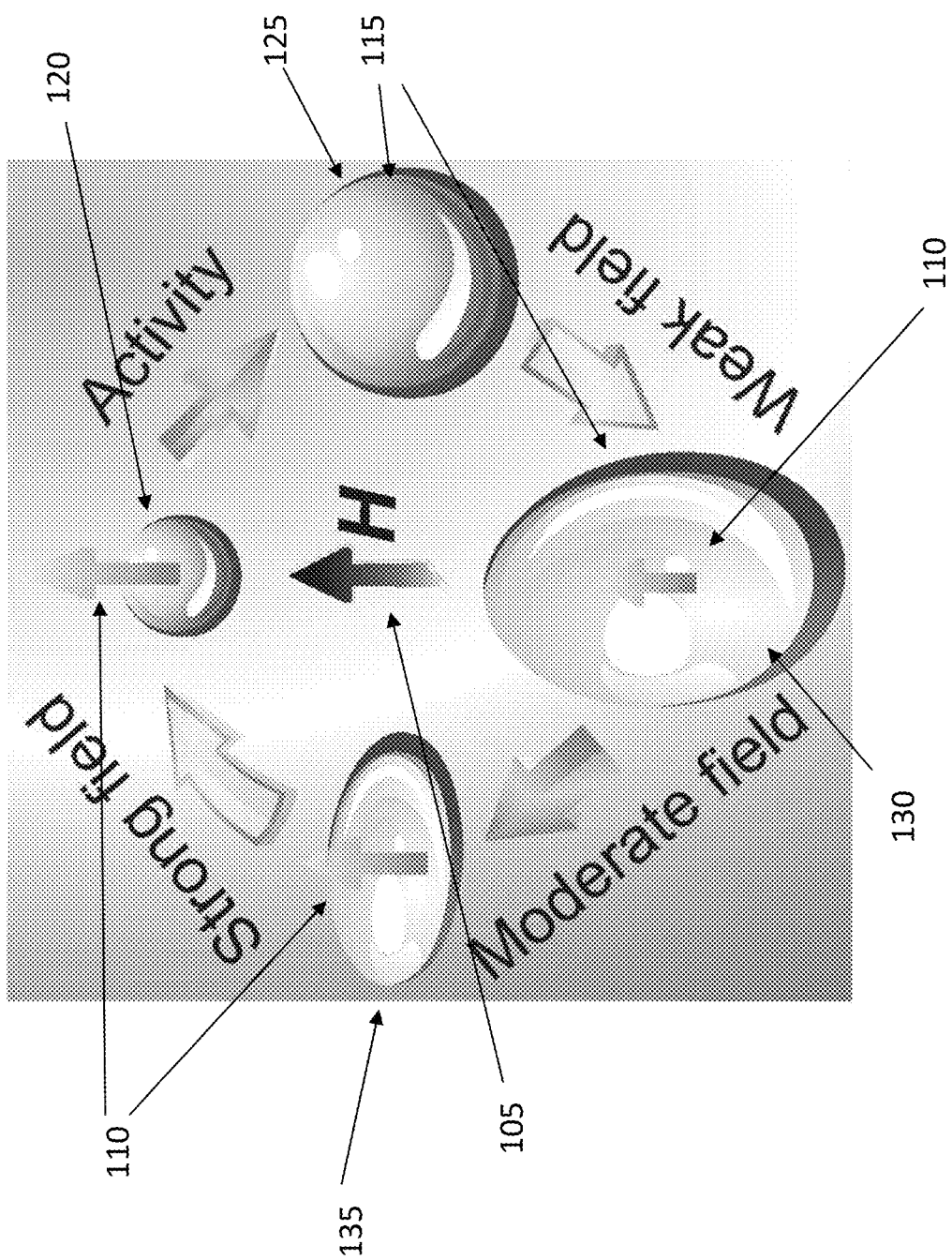
FIG. 1 illustrates a schematic of the shape, size, and motion of a soft, compressible gel loaded with light-activated synthetic colloidal particles.

In a first aspect of the disclosure, a system is described, the system comprising: a flexible material enclosure; and at least one self-propelled body within the flexible material enclosure, wherein the at least one self-propelled body is capable of responding to an external field.

In a second aspect of the disclosure, a method is described, the method comprising: inserting at least one self-propelled body within a flexible material enclosure; and applying a field to the at least one self-propelled body, wherein the intensity and direction of the field is determined according to a desired behavior of the at least one self-propelled body.

In a third aspect of the disclosure, a method is described, the method comprising: inserting a plurality of self-propelled bodies within a flexible material enclosure; and by applying a field to the plurality of self-propelled bodies, applying a force, by the plurality of self-propelled bodies, normal to a surface of the flexible material enclosure and directed outward relative to the flexible material enclosure, wherein the strength and direction of the field is determined according to a desired value for the force applied normal to the surface of the flexible material enclosure.

DETAILED DESCRIPTION

The present disclosure relates to an active nano/micro-mechanical device and/or motor using microscopic self-propelled bodies, such as for example E. coli bacteria or synthetic colloidal particles. In some embodiments, the present disclosure may load active swimmers (for example, microorganisms or other self-propelled bodies) into soft, compressible materials to achieve a wide range of controllable motion and deformation, a technology which may have widespread commercial utility. In the present disclosure, the term "swimmers" can be used to refer to active bodies that can move in a fluid, for example bacteria or other microorganism that can move in a fluid solution.

When self-propelled objects (e.g., microorganisms) are exposed to an external field (e.g., magnetic, gravitational, thermal, nutrient concentration), they may adjust their swimming trajectories to facilitate movement to a favorable region. For example, E. coli have been known to undergo "chemotaxis" by preferentially swimming towards (or away from) chemical gradients of nutrients (or toxins). The present disclosure can exploit this unique behavior of active objects to design soft, compressible materials whose size, shape, and motion can be manipulated and tuned by loading the material with active swimmers. In some embodiments, the swimmers exert different normal forces in different directions relative to the material, which may cause it to compress/expand, elongate, and translate depending on the external field strength. Such an active system can be used as a nano/micromechanical device and motor.

In other words, a material, for example a biological or synthetic membrane, may be filled with one or more swimmers. The system comprising the material and the swimmers may be placed in a fluid. By applying a field, for example a magnetic or chemical concentration field, to the fluid, the swimmers may act on the material based on the applied field. In response to the action of the swimmers, the material may mechanically deform and/or move in a desired direction.

The soft, compressible material may be, for example, a gel polymer network, biological membrane, vesicle, fluid sack, or droplet, whose properties can be tuned as desired. In some embodiments, the swimmers are colloidal particles, and the activity of the synthetic colloidal particles can be controlled through the strength of an external orienting field. With careful adjustment of these parameters, it can be possible to control and steer the nano/micromechanical device as shown for example in FIGS. 1 and 2, described below.

Active swimmers can exert a unique "swim pressure" of the order of about O(1) Pa, which can cause soft and flimsy materials to deform. Even in cases where the material does not deform, it can still be translated and steered using the active swimmers.

The technology of the present disclosure has commercial utility and may serve many purposes, for example from developing improved microfluidic devices to synthesizing active biological vesicles for drug delivery.

In the present disclosure, an analysis is described on the stress, dispersion, and average swimming speed of self-propelled particles subjected to an external field that affects the orientation and speed of the particles. The swimming trajectory can be governed by a competition between the orienting influence (i.e., taxis) associated with the external (e.g., magnetic, gravitational, thermal, nutrient concentration) field versus the effects that randomize the particle orientations (e.g., rotary Brownian motion and/or an intrinsic tumbling mechanism like the flagella of bacteria). The swimmers' motion can be characterized by a mean drift velocity and an effective translational diffusivity that becomes anisotropic in the presence of the orienting field. Since the diffusivity yields information about the micromechanical stress, the anisotropy generated by the external field creates a normal stress difference in the "swim stress" tensor as described for example in Takatori, Yan, and Brady, *Phys Rev Lett*, 2014, the disclosure of which is incorporated herein by reference in its entirety. The effect of the applied fields on the swimmers within a material, described above, can be exploited in the design of soft, compressible materials in which their size, shape, and motion can be manipulated and tuned by loading the material with active swimmers. Since the swimmers can exert different normal stresses in different directions, the material can compress/expand, elongate, and translate depending on the external field strength. Such active systems can be used as nano/micromechanical devices and motors. In the following, analytical solutions are corroborated by Brownian dynamics simulations which describe the behavior of some embodiments of the present disclosure.

Understanding the complex dynamic behaviors of a suspension of self-propelled colloidal particles, or "active matter," has been an important but challenging problem owing to its constituents' ability to generate their own internal stress and drive the system far from equilibrium. This allows intriguing phenomena to arise that otherwise may not take place in a classical equilibrium system, like athermal self-assembly and pattern formation, see Ref. [1]. Through their self-motion, all active matter systems of the type described herein generate an intrinsic "swim stress" that impacts their large-scale collective behavior, see Ref. [2]. The origin of the swim stress (or pressure) is based upon the notion that all self-propelled bodies must be confined by boundaries to prevent them from swimming away in space. The "swim pressure" is the unique pressure exerted by the swimmers as they bump into the surrounding walls that confine them. The same principle can apply, for example, to molecular gases that collide into the container walls to exert pressure, or to the osmotic pressure exerted by solute molecules.

In the present disclosure an active matter system is described, subjected to an external field that affects its constituents' swimming orientation and speed. External fields like chemical and thermal gradients and/or the Earth's magnetic and gravitational fields can cause microorganisms to modify their swimming behavior to facilitate movement to a favorable region. For example, *E. coli* have been known to undergo chemotaxis by preferentially swimming towards (or away from) chemical gradients of nutrients (or toxins), see Ref. [3]. Other examples of taxis swimmers include phototactic, see Ref. [4], magnetotactic, see Ref. [5], and gravitactic, see Ref. [6], bacteria.

External orienting fields cause the effective translational diffusivity to become anisotropic, which directly implies the existence of normal stress differences. The micromechanical stress in a dilute suspension is given by the first moment of the force, $\sigma = -n\langle xF \rangle$, where n is the number density of particles and the angle brackets denote an ensemble average over all particles and time; F is the force vector and x is the position vector. The particle position at time t is $x(t) = \int U(t') dt'$, and from the overdamped equation of motion, $0 = -\zeta U(t) + F(t)$, it is obtained that $\sigma = -n\langle xF \rangle = -n\zeta \int \langle U(t')U(t)\rangle dt' = -n\zeta \langle D \rangle$, where $\zeta$ is the hydrodynamic drag factor and the time integral of the velocity autocorrelation is the diffusivity of the particle, D. A particle undergoing any type of random motion therefore exerts a stress and a pressure: $\Pi = -\text{tr } \sigma/3 = n\zeta D$. This general result applies for Brownian particles where $D_0 = k_B T/\zeta$, where $k_B$ and T are the Boltzmann constant and the temperature respectively, leading to the ideal-gas Brownian osmotic pressure $\Pi^B = nk_B T$. Using the swim diffusivity of active particles in the absence of an external field, $\langle D \rangle^{swim} = U_0^2 \tau_R / 6$ where $U_0$ is the swim speed of the active particle and $\tau_R$ is the reorientation time due to rotary Brownian motion and/or an intrinsic reorientation mechanism, it is obtained that the "ideal-gas" swim stress is $\sigma^{swim} = -n\langle xF^{swim} \rangle = -n\zeta \langle D^{swim} \rangle = -n\zeta U_0^2 \tau_R/6$, where $F^{swim} \equiv \zeta U_0$ is the self-propulsive force of the swimmer, see Ref. [2]. An external field may cause the effective diffusivity and hence the swim stress to become anisotropic. The present disclosure describes below how this normal swim-stress difference is generated, and what are its implications on the design of novel active soft-matter materials.

FIG. 1 illustrates a schematic of the shape, size, and motion of a soft, compressible gel loaded with light-activated synthetic colloidal particles. When light is applied to the system, and an external field (H) (105) is turned on concurrently, the gel (115) translates in the direction of the field, as shown by arrows (110) on the gel (115). The external field strength can be tuned to change the shape, size, and velocity of the gel (115).

To describe an exemplary application of normal swim stresses, an exemplary embodiment is described related to the design of nano/micromechanical devices and motors. For example, a soft, compressible material (e.g., gel polymer network) can be loaded with light-activated synthetic colloidal particles. In the absence of light, the colloidal particles fluctuate in a solution due to Brownian motion, and the gel assumes some equilibrium shape as shown for example in FIG. 1 (120). The equilibrium volume of the gel is determined by the balance of the force that drives the polymer to expand and mix with the solvent versus the elastic force that resists the expansion, see Ref. [7]. When the light is turned on, the colloidal particles become active and exert an "ideal-gas" swim pressure, $\Pi^{swim} = -\text{tr } \sigma^{swim}/3 = -n\zeta U_0^2 \tau_R/6$, causing the gel to expand isotropically as shown in (125). The relative magnitudes of the swim pressure versus the shear modulus of the gel, G, determine whether the gel expands appreciably in the presence of the swimmers. In principle the shear modulus of polymer networks can be adjusted to nearly zero. A dilute network of hydrated mucus, which behaves as a non-Newtonian gel, has shear moduli of order of about O(0.1-10) Pa, see Refs. [8,9]. In this example, it can be estimated that G is about $n_c k_B T$ where $n_c$ is the number density of sub-chains in the network (related to the cross-link density), see Ref. [7]. The energy scale associated with 1 μm swimmers traveling in water with speed $U_0$ of about 10 μm/s and reorienting in time $\tau_B$ of about 10 s is $\zeta U_0^2 \tau_R/6$, that is about 4 pN·μm. The thermal energy at room temperature is $k_B T$ or about $4 \times 10^{-3}$ pN·μm, meaning that the swimmers' intrinsic self-propulsion can be equivalent to approximately 1000 $k_B T$. In practice the intrinsic activity of active synthetic colloidal particles can be even larger. The swim pressure makes an appreciable contribution to the overall size of the gel if $G/\Pi^{swim} = n_c k_B T/(n\ 1000\ k_B T) \le O(1)$, or when the ratio of the polymer sub-chain density to the active-swimmer density is $n_c/n \le 1000$. The swim pressure exerted at 10% volume fraction of active particles is $\Pi^{swim} = n\zeta U_0^2 \tau_R/6$ that is about O(1) Pa.

For gels with a very small shear modulus, the swim pressure can cause the gel to deform its shape. As the gel expands due to the swim pressure, the concentration of swimmers decreases. The new volume of the gel is determined by the balance of the gel's expansion forces, the osmotic pressure of the polymer chains, and the swim pressure exerted by the swimmers. Even if the gel does not deform, it can still be translated and be steered using the active swimmers.

As described below, when a weak external field is applied to the system (the system comprising the gel plus the swimmers), the gel can react in three ways as shown in FIG. 1 (130) compared to (125): it expands even more due to an increase in the swim pressure; it elongates in the field direction (105) due to a positive normal stress difference (i.e., the swimmers exert different magnitudes of normal stresses in different directions of the bounding gel network); the entire gel translates in the field direction due to the net motion of the active swimmers colliding into the gel network. Upon further increase in the external field strength, the swim pressure decreases and the normal stress difference becomes negative, which causes the gel to shrink in size, translate faster towards the field direction, and assume the shape of a thin disk as shown in FIG. 1 (135). When the external field strength is made very high, the normal swim-stress difference and swim pressure vanish, causing the gel to return to its equilibrium shape and size (120) but translate in the field direction (105).

It is possible to estimate the gel speed as described below. If an active particle is tethered to a passive particle then the active particle must drag along the passive particle as it swims. The propulsive force available to the swimmer, $F^{swim} \equiv \zeta U_0$, must now balance the combined drag of the swimmer ($-\zeta U$) and its "cargo", which is characterized by a Stokes drag coefficient $\zeta_C$. Thus, the velocity of the combined object is $U = \zeta U_0/(\zeta_C + \zeta)$. If N swimmers are attached, the velocity would now be $U = N\zeta U_0/(\zeta_C + N\zeta)$. The same principle and estimate apply to swimmers confined to a gel. The total propulsive force available F is about $n\ V_{gel}\ \zeta \langle u \rangle$, where $V_{gel}$ is the volume of the gel and $\langle u \rangle$ is the mean swimmer velocity in the presence of the external field (as calculated below). This force must balance the gel and swimmers' drag $F^{drag} = (\zeta_{gel} + n\ V_{gel}\ \zeta) U_{gel}$ to give $U_{gel} \sim n\ V_{gel} \langle u \rangle \zeta/\zeta_{gel}(1/(1 + n\ V_{gel}\ \zeta/\zeta))$. The porosity and geometry of the gel would influence $\zeta_{gel}$, but the drag is proportional to $U_{gel}$ as in any Stokes-flow problem.

When the external field is turned off, the gel stops translating and an entire cycle is completed as depicted in FIG. 1. In the example above, it is assumed that the active particles are confined to the gel and that the fluid (solvent) is able to flow through the gel as needed. Instead of a gel there could also be a membrane, vesicle, fluid sack, or droplet. To ensure that the system is in osmotic balance with the solvent inside the vesicle, the surrounding membrane must be permeable to the solvent. The resistance to motion of the vesicle would now be set by the permeability of the membrane and the propulsive force determined by the number of swimmers contacting the (interior) upstream surface of the vesicle. If a vesicle or fluid droplet is impermeable to the solvent, then the droplet may still deform and may also translate depending on its shape and mechanical properties of its surface or bounding membrane. A rigid object filled with fluid and swimmers would not deform nor translate; the active motion of the swimmers would set up a recirculating flow within the rigid object.

Figure 2:
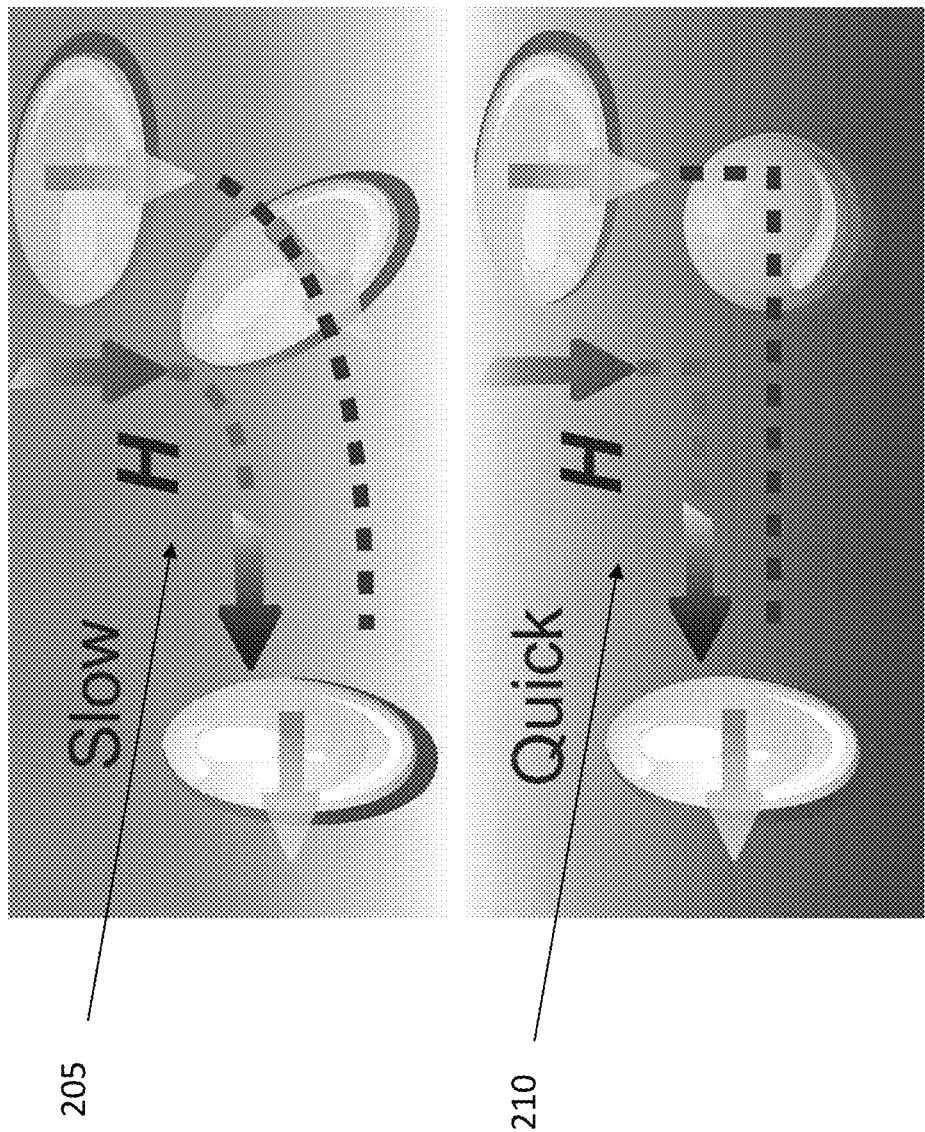
FIG. 2 illustrates a schematic of the motion of a soft, compressible gel loaded with active particles when the external field is rotated by 90 degrees.

FIG. 2 illustrates a schematic of the motion of a soft, compressible gel loaded with active particles when the external field is rotated by 90 degrees. The shape and trajectory of the gel depends on the relative rate of rotation of the field and the strength of the field.

In other embodiments of nano/micromechanical devices and motors, the external field can be rotated, for example by 90 degrees. For a moderate external field strength, the gel reacts differently depending on the relative magnitude of the characteristic angular velocity induced by the external field, $\Omega_c$ and the rate at which the field is rotated, $\Omega_{ext}$. When the field rotates slowly, $\Omega_{ext}/\Omega_c \ll 1$, the gel maintains its current shape and slowly changes its orientation with the swimmers, tracing an arc and continuing a path along the new field direction, as shown in FIG. 2 (205). When the field rotates quickly, $\Omega_{ext}/\Omega_c \gg 1$, the swimmers respond quickly and begin to swim in the new field direction as in FIG. 2 (210). In this limit the gel temporarily stops translating because the swimmers do not take any swim steps between their reorientations. After the swimmers change their orientations toward the new field direction, the gel again assumes a disk shape and translates with the swimmers. As illustrated in FIGS. 1 and 2, by tuning the properties of the gel (or vesicle or drop), the activity of the swimmers, and the strength of the external orienting field, a wide range of controllable motion is possible. It is important to note that if one can measure the effective translational diffusivity of active particles in an orienting field, then the stress is known from the equation $\sigma = -n\zeta \langle D \rangle$. It is thus possible to make predictions of the shape and size of the gel based upon a simple diffusivity measurement (or estimation) of the swimmers.

The motion of a single particle due to an intrinsic swim force and an external force are the same. At higher concentrations or when considering the swimmer's interactions with other bodies or boundaries a distinction must be made—the intrinsic swim mechanism does not generate a long-range 1/r Stokes velocity field as does an external force. In the present analysis the hydrodynamic interactions among the particles have been neglected, which would contribute additional terms to the active-particle stress and affect the reorientation time of the particles. It is important to note that the swim stress presented here is distinct and different from the "hydrodynamic stresslet," which is also a single-particle property but scales as $n\zeta U_0 a$ where a is the particle size, see Refs. [8,9]. No study to date has studied the effect of an external field on the swim stress of active matter. The ratio of the magnitude of the hydrodynamic stresslet over the swim pressure is the reorientational Peclet number, $Pe_R = U_0\ a/\langle D^{swim} \rangle$, which can be approximated as $a/(U_0\ \tau_R)$ and compares the swimmer size a to its run length $U_0 \tau_R$, see Ref. [2]. The hydrodynamic contribution to the deformation of soft materials becomes negligible at low $Pe_R$, the regime in which many synthetic active particles operate, see Refs. [12,13].

In the present disclosure a micromechanical model is described that determines the average translational velocity, diffusivity, and swim stress of a suspension of active particles in any external field. Previous studies of the translational diffusivity of Brownian particles have used a generalized Taylor dispersion method to analyze the behavior when subjected to an external orienting field and/or a homogeneous shear flow, see Refs. [14-18]. Manela and Frankel, see Ref. [17], analyzed the effective translational diffusivity of dipolar swimmers subjected to a simple shear flow and an external field, and Bearon and coworkers, see Refs. 19,20] extended the analysis to different flow conditions. Owing to slow numerical convergence, most studies have focused on weak external fields; in practice, however, active particles may be exposed to strong external fields, be it a chemical or thermal gradient field. As shown in the present disclosure, strong external fields are interesting because the convective enhancement to the effective translational diffusivity ($\langle D \rangle^{swim} = U_0^2 \tau_R/6$) vanishes entirely. Furthermore, most studies assume a constant swimming speed of the particles, irrespective of the external field strength. In nature or in the laboratory, the local chemical and thermal environments can affect the swimming speeds of active particles. Indeed, bacteria modulate their swimming speeds when exposed to a thermal (see Ref. [21]) or chemoattractant concentration field, see Ref. [22]. This problem can be addressed by allowing the swimmers to modify their speeds based on their instantaneous orientation. The analytical model described herein is corroborated by Brownian dynamics (BD) simulations.

The balance between the strength of the orienting field and the effects that randomize the particle orientation is characterized by the Langevin parameter, $\chi_R = \Omega_c \tau_R$, where $\Omega_c$ is the characteristic angular velocity induced by the external field and $\tau_R$ is the reorientation time from rotary Brownian motion and/or an intrinsic reorientation mechanism. Dimensional reasoning provides predictions of the effect of the external field on the average swimming speed, effective translational diffusivity, and swim stress. The self-propulsive enhancement to a swimmer's effective translational diffusivity scales as $\langle D \rangle^{swim}$ which can be approximated as $L_{eff}^2/\tau_R$, where $L_{eff}$ is the effective step size. In the absence of an external field $L_{eff}$ can be approximated as $U_0 \tau_R$, giving $\langle D^{swim} \rangle$ which is about $U_0^2 \tau_R$. With the external field in the linear response regime, the change in the effective step size, $\Delta L_{eff}$ can be approximated as $\chi_R U_0 \tau_R$, so the change in swim stress scales as $\Delta \sigma^{swim} = -n\zeta \langle \Delta D^{swim} \rangle$ or about $-n\zeta(U_0^2 \tau_R)\chi_R^2$. The average velocity along the external field scales as $\langle u_\| \rangle$ or $L_{eff}/\tau_R$, that is $U_0 \chi_R$, linear in the forcing. The average velocity transverse to the external field is zero for all values of $\chi_R$: $\langle u_\perp \rangle = 0$. Thus, $\langle D \rangle$ is about $D_0 + U_0^2 \tau_R/6 (1 + O(\chi_R^2))$ and $\sigma^{swim}$ is about $-n\zeta U_0^2 \tau_R/6(1 + O(\chi_R^2))$ and is anisotropic.

For $\chi_R \gg 1$, the external field is so strong that the swimmers spend most of their time oriented along the field. This suggests that the average swimmer velocity ($u_\|$) is about $U_0(1 - \chi_R^{-1})$; the instantaneous swimmer velocity is the same as the average velocity, minus a small $O(\chi_R^{-1})$ correction. The effective translational diffusivity depends on the fluctuation of the swimmers' instantaneous speed from the average speed. This gives the effective step size $L_{eff}$ as $(\langle u \rangle - U_0)\tau_R$. Parallel to the external field then $\sigma_\|^{swim} = -n\lambda \langle D^{swim} \rangle$ which can be approximated as $-n\zeta U_0^2 \tau_R \chi_R^{-3}$. In the transverse direction, the average velocity is zero so a small fluctuation in an individual swimmer's perpendicular motion affects the dispersion more strongly than small fluctuations along the external field. This suggests that the swimmer's perpendicular velocity decays more slowly, as $u_\perp$ which is about $O(\chi_R^{-1/2})$, giving $\sigma_\perp^{swim} = -n\zeta \langle D_\perp^{swim} \rangle$ which can be approximated as $-n\zeta U_0^2 \tau_R \chi_R^{-2}$. Under strong external fields the swim stress and diffusivity tend to zero.

In the following, an expression is formulated for the average translational flux, from which it is possible to deduce the swim stress and the average translational velocity and diffusivity. In the following, the evolution equations governing the orientation distribution and fluctuation fields can also be derived. A similar approach has been used to study two-body collisions in nonlinear microrheology, see Ref. [23], which is extend here into orientation space. In the following, a first example of swimmers with uniform speeds is also described. The present disclosure further describes a BD simulation framework to verify the analytical theory. Further, the swimming speeds are allowed to vary with orientation and field strength.

Figure 3:
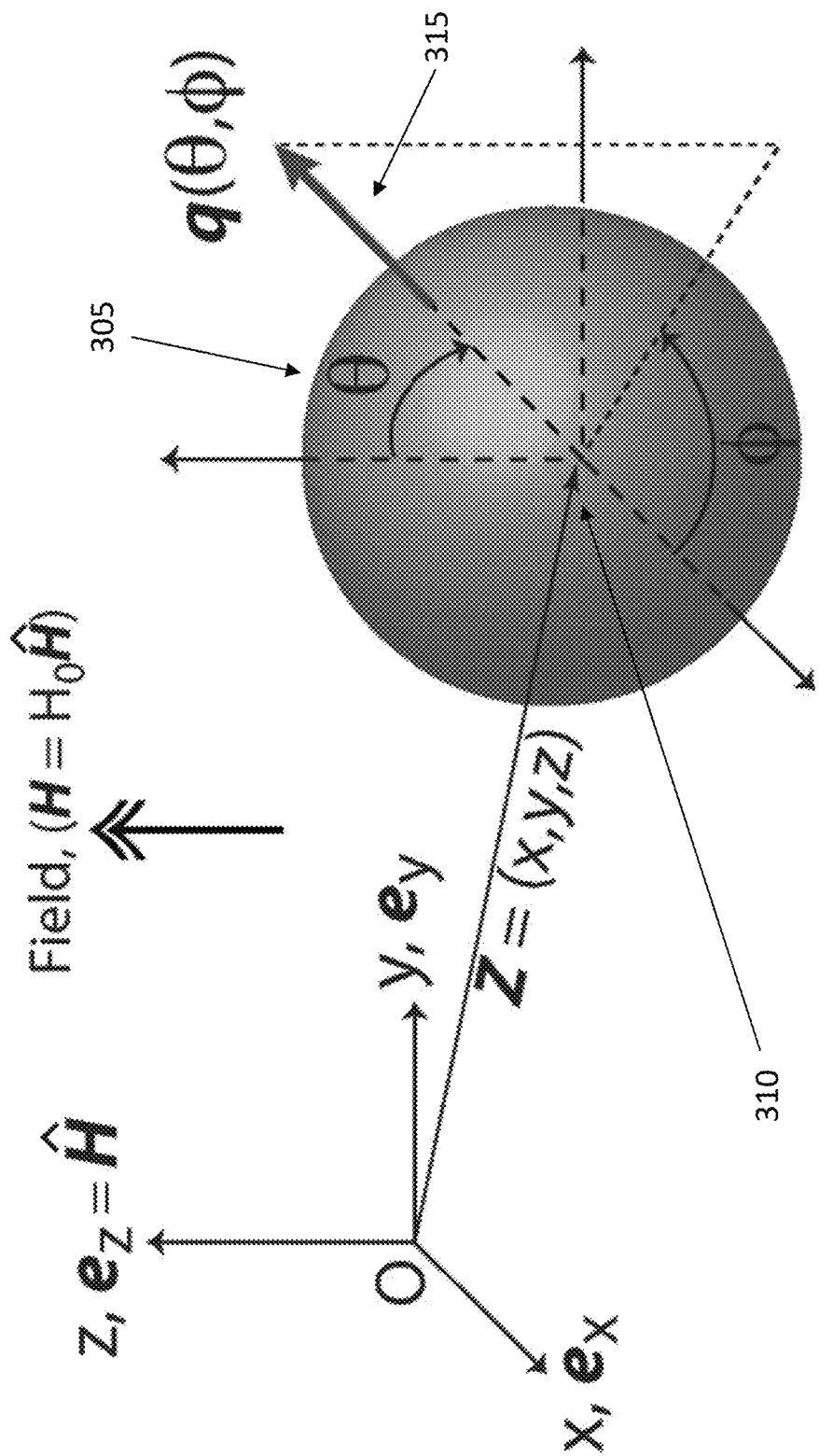
FIG. 3 illustrates a definition sketch of an active particle at position z with orientation q in an external field, H.

FIG. 3 illustrates a definition sketch of an active particle (305) at position z with orientation q (315) in an external field, H.

In some embodiments, the average swimmer motion can be calculated by focusing on the motion of a single active Brownian particle that swims in a quiescent fluid with an orientation-dependent velocity u(q), where the unit vector q specifies its orientation. The swimming velocity can be a result of intrinsic self-propulsion from a living microorganism or an activated synthetic catalytic particle, see Refs. [1,24]. The particle can also undergo random thermal motion with a translational diffusivity $D_0$, and reoriens due to rotary Brownian motion and/or an intrinsic mechanism (e.g., flagella), characterized by a reorientation time $\tau_R$. For torqued swimmers like gravitactic or magnetotactic bacteria, the external field induces an orientation-dependent torque on the particle, $L^{ext}(q)$. In contrast, force and torque-free swimmers like phototactic bacteria or other microorganisms undergoing chemotaxis or thermotaxis may possess an internal mechanism (e.g., biological sensor) to reorient themselves along the field. A general analysis remains valid whether the reorientation is induced by an external torque or as a result of an intrinsic particle property. The dynamics of an active particle is contained in $P(z, q, t|z_0, g_0, t_0)$, the conditional probability of finding the particle at position z and orientation q at time t, given that it was at $z_0$ and $g_0$ at time $t_0$. This probability density P obeys the Smoluchowski equation $$\frac{\partial P}{\partial t} + \nabla \cdot j_T + \nabla_q \cdot j_R = 0, \quad (1)$$

where the translational and rotary fluxes are given by, respectively, $$j_T = u(q)P - D_0 \cdot \nabla P, \quad (2)$$

$$j_R = \omega(q)P - \frac{1}{\tau_R} \nabla_q P, \quad (3)$$

where $\omega(q)$ is the orientation-dependent angular velocity of the swimmer, $D_0$ is its Brownian translational diffusivity, and $\nabla$ and $\nabla_q$ are the physical-space and orientation-space gradient operators, respectively.

At times $t \gg \tau_R$ in which all orientations have been sampled, the following expressions can be deduced. The Fourier transform with respect to position (see Ref. [23]) is denoted in the following by the symbol ^. Averaging Eqs. 1 and 2 over orientation space, it can be obtained that:

$$\frac{\partial \hat{n}(k,t)}{\partial t} + ik \cdot \langle \hat{j}_T \rangle = 0, \quad (4)$$

$$\langle \hat{j}_T \rangle = \oint u\hat{P} \, dq - D_0 \cdot ik\hat{n}, \quad (5)$$

where $\hat{n}(k, t) \equiv \oint \hat{P}(k, q, t) \, dq$ is the local number density of active particles. Introducing $\hat{P}(k, q, t) = g(k, q, t) \hat{n}(k,t)$, and focusing on the orientation distribution through the structure function $g(k, q, t)$ allows us to proceed to the next step. For the long-time self-diffusion the short wave vector (long length scale) limit is considered (see Ref. [23]) and it is thus possible to expand for small k: $g(k, q, t) = g_0(q, t) + ik \cdot d(q, t) + O(kk)$. The field $g_0$ is the orientation distribution function, and d is the probability-weighted displacement or fluctuation of a particle about its mean velocity (i.e., the strength and direction of the swimmer's displacement due to the external field). Similarly to the Brenner's generalized Taylor dispersion theory (see Ref. [25]), $g_0$ and d are similar to the $P_0^\infty$ and B fields, respectively. Introducing this expansion into Eq. 5, it is possible to obtain the mean particle translational flux:

$$\langle \hat{j}_T \rangle = \hat{n}[\langle u \rangle - ik \cdot \langle D \rangle], \quad (6)$$

where the average translational velocity and diffusivity are, respectively:

$$\langle u \rangle = \oint u(q) g_0 \, dq, \quad (7)$$

$$\langle D \rangle - D_0 = \langle D^{swim} \rangle = \oint (\langle u \rangle - u(q)) d \, dq. \quad (8)$$

In Eq. 8 the term $\langle u \rangle$ was inserted to emphasize that it is the velocity fluctuation that generates dispersion.

In the present disclosure, above, a direct relationship was derived between the translational diffusivity and the micromechanical stress: $\sigma = -n\zeta\langle D \rangle$. Substituting Eq. 8 into this expression gives the stress generated by the active particle, $\sigma = \sigma^B + \sigma^{swim}$, where the Brownian osmotic stress is identified as $\sigma^B = -n\zeta D_0 = -n k_B T I$, and the swim stress as the convective enhancement to the diffusivity (right-hand side of Eq. 8):

$$\sigma^{swim} = -n\zeta \oint \langle u \rangle - u(q)) d \, dq. \quad (9)$$

Eqs. 7 to 9 are the main results. The swim pressure is given by $\Pi^{swim} = \text{tr}\langle \sigma^{swim} \rangle/3$ and is interpreted as the average normal swim stress (i.e., the confinement forces) necessary to prevent an active body from swimming away in space, see Ref. [2].

The non-equilibrium orientation and fluctuation fields can be calculated as follows. The evolution equations governing the orientation-distribution function $g_0$ and the fluctuation field d can be developed for use in Eqs. 7 to 9. From the Smoluchowski Eq. 1, $g(k, q, t)$ satisfies $$\frac{\partial g}{\partial t} + \nabla_q \cdot (\omega(q)g) - \frac{1}{\tau_R} \nabla_q^2 g = g \, ik \cdot [\langle u \rangle - u(q) - ik \cdot (\langle D \rangle - D_0)], \quad (10)$$

where g is finite on the unit sphere and is normalized: $\oint g(k, q, t) \, dq = 1$.

To proceed to further calculation steps, a form of $\omega(q)$ is needed, the rotary velocity that reorients the biased swimmer along the external field or gradient, H. For force and torque-free swimmers, like microorganisms undergoing phototaxis, chemotaxis, and/or thermotaxis, it can be assumed that the swimmers possess an intrinsic mechanism (e.g., biological sensor) to reorient themselves along H. An expression for the rotary velocity that models this behavior is $\omega(q) = \Omega_c \, q \times \hat{H}$, where $\Omega_c$ is the magnitude of the angular velocity and $\hat{H}$ is the unit vector along the field. This expression implies that the swimmer attains the maximum rotary velocity when $q \perp \hat{H}$, and zero rotary velocity when $q \| \hat{H}$. Another class of swimmers, like magnetotactic or gravitactic bacteria, reorient themselves owing to a torque induced by the external field, $\omega(q) = M_R \cdot L^{ext}$, where $M_R$ is the rotary mobility tensor. Similarly to Ref. [26], it is possible to show that this swimmer mechanism leads to the same expression as that of the torque-free swimmers. As a consequence, the detailed reorientation mechanism is unimportant, and both types of swimmers can be modeled with the same expression for the rotary velocity. When analyzing the motion of a single particle, there is no distinction between rotation caused by an external torque and motion arising inherently from the swimmer.

The equations are made dimensionless by scaling u as $U_0$, $\omega(q)$ as $\Omega_c$, and d as $U_0 \tau_R$. Using the small-k expansion and considering a spherical particle with a constant, isotropic Brownian diffusivity, the steady-state orientation distribution function satisfies a convection-diffusion equation:

$$\nabla_q^2 g_0 - \chi_R \nabla_q \cdot [(q \times \hat{H}) g_0] = 0, \quad (11)$$

with $\oint g_0 \, dq = 1$, and $\chi_R = \Omega_c \tau_R$ is the Langevin parameter. The d-field satisfies a similar equation, but is forced by deviations from the mean velocity:

$$\nabla_q^2 d - \chi_R \nabla_q \cdot [(q \times \hat{H}) d] = -g_0(\langle u \rangle - u(q)). \quad (12)$$

In the following, the uniform swimming velocity can be calculated. In the following section, it is assumed that all particles have the nondimensional swim velocity $u(q) = q$. It can be seen (as described later) that allowing the speed to change with orientation leads to additional interesting dispersive effects. Eqs. 11 and 12 have exact analytical solutions, but it is possible to first consider the limiting behaviors at low and high $\chi_R$.

For the $\chi_R \ll 1$ limit: As shown below in the present disclosure, a regular perturbation can be applied to obtain $g_0(q) = 1/(4\pi) + \hat{H} \cdot P_1(q) \chi_R/(4\pi) + \hat{H}\hat{H} : P_2(q) \chi_R^2/(12\pi) + O(\chi_R^3)$, where $P_n(q)$ are the $n^{th}$-order tensor surface spherical harmonics, see Ref. [27]. This result is identical to the result found in Ref. [15], which considered the sedimentation of axisymmetric non-centrosymmetric particles by gravity. Whether the orienting torque is caused by shape-dependent gravitational settling or from dipole-induced alignment, the orientation distribution is the same.

Substituting this solution into Eq. 7, the average translational velocity of the swimmers at low $\chi_R$ is $$\langle u \rangle = \frac{1}{3} \chi_R \hat{H} + O(\chi_R^3). \quad (13)$$

The average velocity increases linearly with $\chi_R$, as predicted from simple scaling arguments. As $\chi_R \to 0$ the orientation distribution becomes uniform, resulting in no net swimming speed.

To obtain a leading-order correction in the swim stress and translational diffusivity, it is possible to proceed to the $O(\chi_R^2)$ d-field problem. Substituting the d-field solution (as described later in the present disclosure) into Eqs. 8 and 9, it is possible to obtain the swim diffusivity and stress for $\chi_R \ll 1$:

$$\sigma^{swim} = \qquad (14)$$
$$-n\zeta \langle D^{swim} \rangle = -\frac{n\zeta U_0^2 \tau_R}{6}\left[I - \frac{6}{5}\chi_R^2\left(\frac{7}{27}\hat{H}\hat{H} + \frac{1}{8}(I - \hat{H}\hat{H})\right)\right] + O(\chi_R^4).$$

The transversely isotropic form has been adopted, where $\hat{H}\hat{H}$ and $1-\hat{H}\hat{H}$ correspond to the parallel and perpendicular components relative to the field direction, respectively. As $\chi_R \to 0$ the "ideal-gas" swim pressure is recovered, $\Pi^{swim} = n\zeta U_0^2 \tau_R/6$, see Ref. [2]. The first effect of the external field appears at $O(\chi_R^2)$, in agreement with the scaling arguments described above. It can be noticed that the external field causes a decrease in the translational diffusivity, in contrast to the increase seen in the sedimentation problem, see Ref. [15]. The dispersion decreases here because the particles now swim collectively toward $\hat{H}$, reducing their tendency to take random swim steps.

For the $\chi_R \gg 1$ limit: A singular perturbation scheme is required for $\chi_R \gg 1$ because the problem separates into an outer and inner region. Near $\mu = \hat{H} \cdot q$ as approximately 1, there is an orientation-space boundary layer and the angular coordinate is rescaled as $\hat{\mu} = (1-\mu)\chi R$ which can be approximated to 01. To leading order, g0 and d are zero in the outer region because the orientation of the swimmer is confined to a $1/\chi_R$-thick "cone" around pt approximately equal to 1. As shown below in the present disclosure, the leading-order boundary-layer solution to Eq. 11 is $g_0(\hat{\mu}; \chi_R) = \chi_R \, e^{-\hat{\mu}}/(2\pi) + O(1)$. As $\chi_R \to \infty$, the orientation distribution approaches a delta-function peaked at $\hat{\mu}=0$, confining the swimming trajectory to a narrow "cone" about the field direction. From Eq. 7, the average translational velocity is $\langle u \rangle = (1-\chi_R^{-1})\hat{H}$. To leading order, all swimmers move along the field direction, $\hat{H}$, at the same speed, $U_0$.

The d-field problem is resolved into a direction parallel ($d_\parallel$) and perpendicular ($d_\perp$) to the external field. The swim diffusivity and stress for $\chi_R \gg 1$ are $$\sigma^{swim} = -n\zeta\langle D^{swim}\rangle = -n\zeta U_0^2 \tau_R\left[\frac{1}{2}\chi_R^{-3}\hat{H}\hat{H} + \chi_R^{-2}(I - \hat{H}\hat{H})\right]. \qquad (15)$$

As $\chi_R \to \infty$, the swim stress vanishes entirely, including the "ideal-gas" pressure $\Pi^{swim} = n\zeta U_0^2 \tau_R/6$ that was present at low $\chi_R$ (see Eq. 14). Since all particles are oriented along a $1/\chi_R$-thick "cone" about the field, each particle swims at the same velocity $U_0$ towards the same direction, resulting in a vanishingly small dispersion. Since it is the random diffusion of a particle that gives rise to a swim pressure, $\Pi^{swim} = n\zeta \text{tr}\langle D^{swim}\rangle/3$, a small diffusivity results in a small swim pressure. Another way to understand the above is to suppose that the bounding walls in a simulation cell were translating with the average particle velocity, $\langle u \rangle$. As $\chi_R \to \infty$, all particles are swimming with the same speed in the same direction so no confinement pressure is required to contain the particles inside the simulation cell, see Ref. [2].

The exact solution for arbitrary $\chi_R$ can be calculated as in the following. As described below, the solution to Eq. 11 for arbitrary $\chi_R$ is $$g_0(\mu; \chi_R) = \frac{\chi_R}{4}\pi \sinh\chi_R \, e^{\mu\chi_R}, \qquad (16)$$

where $\mu = \hat{H} \cdot q$ as before in the domain $-1 \le \mu \le 1$. From Eq. 7, the average translational velocity for arbitrary $\chi_R$ is $$\langle u \rangle = (\coth\chi_R - \chi_R^{-1})\hat{H} = L(\chi_R)\hat{H}, \qquad (17)$$

where $L(\chi_R)$ is the Langevin function. The average perpendicular velocity is zero for all $\chi_R$. It is possible to resolve the corresponding displacement field in Eq. 12 into the parallel and perpendicular directions. As described below in the present disclosure, the parallel direction has an exact solution. In the perpendicular direction, it is possible to expand the solution as a series of associated Legendre polynomials. The effective translational diffusivity and swim stress can be obtained from Eqs. 8 and 9.

The motion of active particles in an external field can also be analyzed via BD simulations. The system follows the N-particle Langevin equations: $0 = -\zeta(U - U_0) + F^B$ and $0 = -\zeta_R \Omega + L^{ext} + L^R$, where $U$ and $\Omega$ are the translational and angular velocities, $F^B \equiv \zeta U_0$ is the self-propulsive force, $F^B$ is the Brownian force, $\zeta_R$ is the hydrodynamic resistance coupling angular velocity to torque, and $L^{ext}$ and $L^R$ are the torques induced by the external field and rotary Brownian motion and/or an intrinsic reorientation mechanism, respectively. The left-hand sides are zero because inertia is negligible for colloidal dispersions.

The Brownian force and reorientation torque have the white noise statistics $\overline{F^B(t)} = 0$, $\overline{F^B(0)F^B(t)} = 2 k_B T \zeta \delta(t) I$, $\overline{L^R(t)} = 0$, and $\overline{L^R(0)L^R(t)} = 2\zeta_R^2 \delta(t)I/\tau_R$. Particle orientations were updated by relating $\Omega$ to the instantaneous orientation q, see Ref. [28]. The Langevin parameter $\chi_R$ was varied and thus it was possible to analyze the motion of a single active particle for over 4000 realizations and for at least 100 $\tau_R$.

The average translational velocity and diffusivity are given by $\langle u \rangle = d\langle x \rangle/dt$ and $\langle D \rangle = \lim_{t\to\infty} d\langle x'x'\rangle/(2\,dt)$, where $x' = x - \langle u \rangle/dt$ is the displacement of the swimmer from the mean motion. The swim stress was computed from $\sigma^{swim} = -n\zeta\langle x'F^{swim}\rangle$, where $F'^{swim} = F^{swim} - \langle F^{swim}\rangle$. The average swim force over all realizations, $\langle F^{swim}\rangle$, must be subtracted to account for the drift velocity of the particles caused by the external field.

Figure 4:
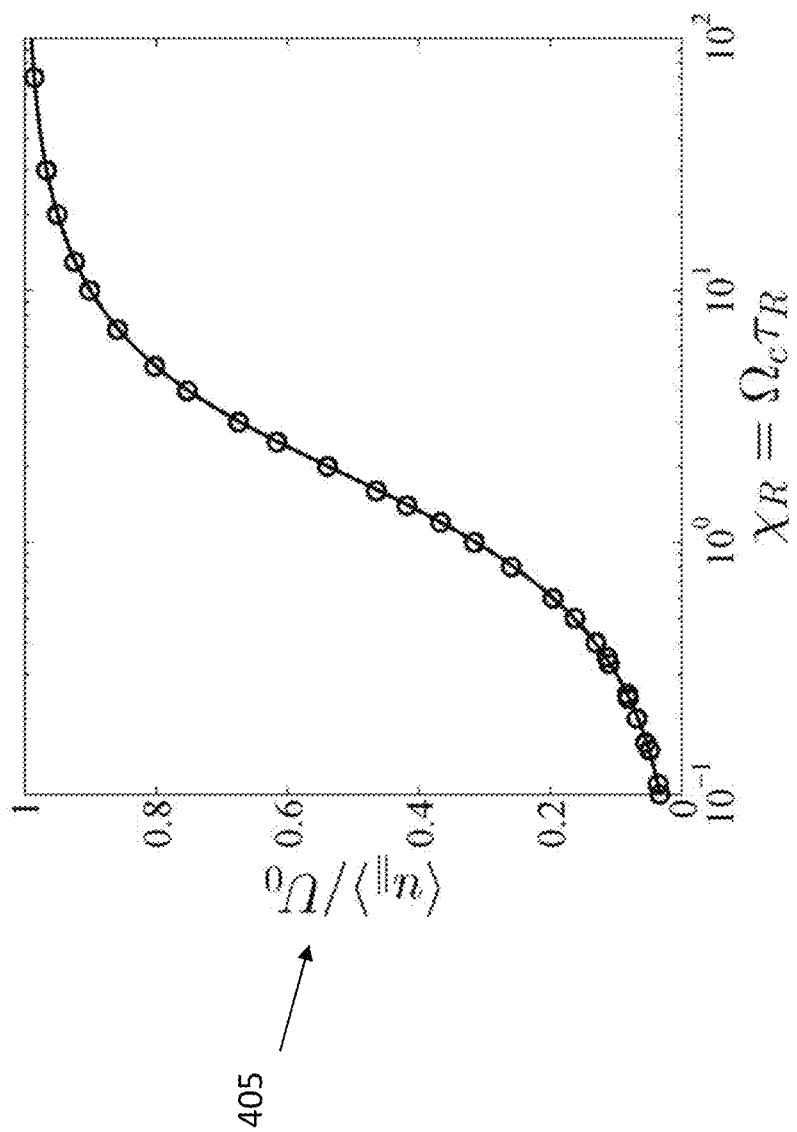
FIG. 4 illustrates the nondimensional average swimmer velocity along the external field as a function of $\chi_R$.

Both the asymptotic and exact solutions of the Smoluchowski equation and BD simulation results are presented together below. FIG. 4 illustrates the nondimensional average swimmer velocity (405) along the external field as a function of $\chi_R$. The average velocity increases linearly following Eq. 13 for low $\chi_R$, and approaches 1 as $\chi_R \to \infty$. There is no average speed transverse to the external field. In FIG. 4, the average translational velocity along the external field is plotted as a function of $\chi_R$. The solid curve is the exact analytical solution, and the circles are data from Brownian dynamics (BD) simulations.

In the BD simulations, the swim stress was computed using two methods. One approach is to use the definition of the swim stress, $\sigma^{swim} = -n\zeta\langle x'F^{swim}\rangle$ (shown in circles in FIG. 5). The alternative method is to first calculate the long-time self diffusivity of an active particle and then obtain the swim stress using the relationship $\sigma^{swim} = -n\zeta\langle D^{swim}\rangle$ (shown in squares). The two methods give identical results, verifying that for a single particle the stress is indeed directly related to the diffusivity, $\sigma = -n\zeta\langle D \rangle$. The present results are described for the stress, but the effective translational diffusivity can be obtained by dividing the stress by $-n\zeta$.

Figure 5:
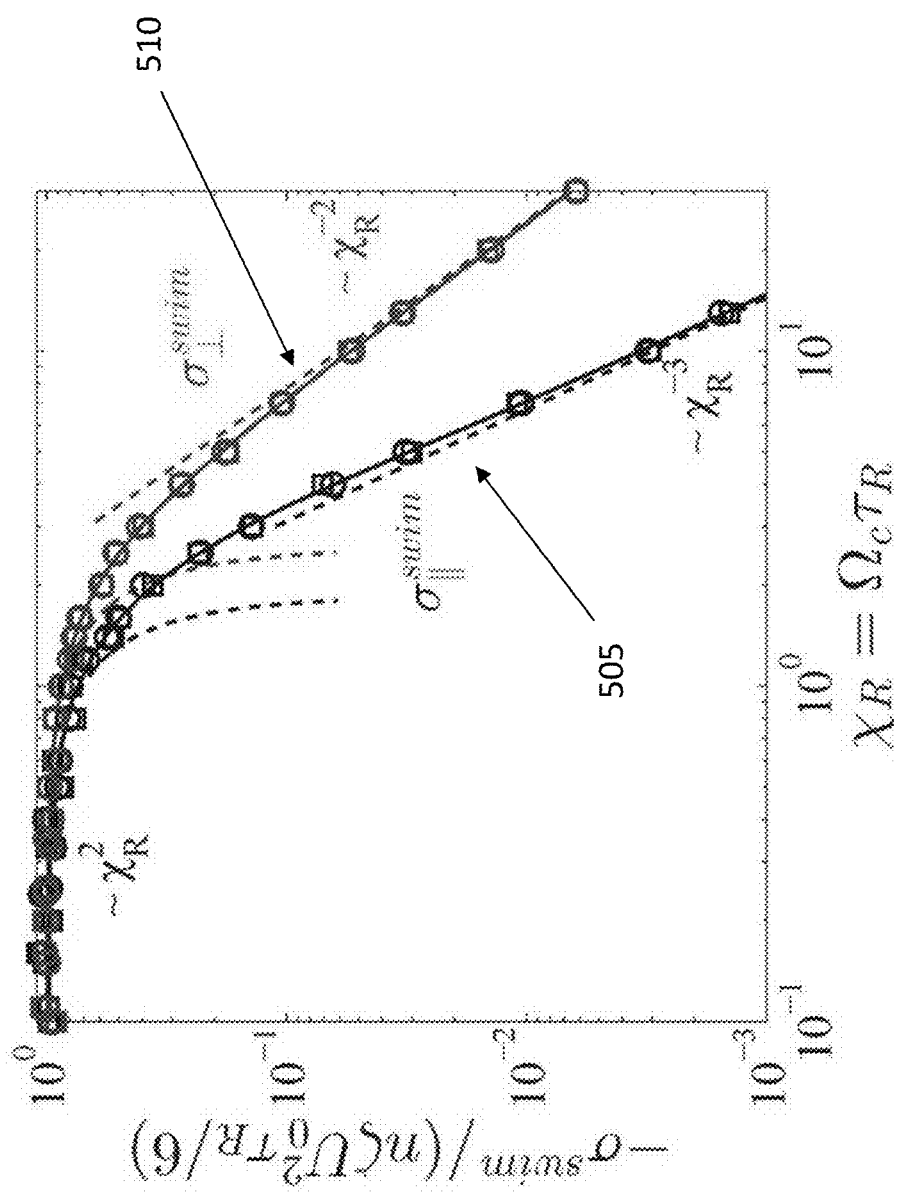
FIG. 5 illustrates the swim stress in the parallel and perpendicular directions as a function of $\chi_R$.

In FIG. 5, the swim stress is plotted in the parallel (505) and perpendicular (510) directions as a function of $\chi_R$, computed in the simulations from $\sigma^{swim}=-n\zeta\langle x'F^{swim}\rangle$ (in circles) and also from first obtaining the effective translational diffusivity and then using $\sigma^{swim}=-n\zeta\langle D^{swim}\rangle$ (in squares). The solid and dashed curves are the exact and asymptotic analytical solutions, respectively.

For $\chi_R\ll 1$, the swim stress reduces to the ideal-gas swim pressure, see Ref. [2]. The swim stress then decreases as $O(\chi_R^2)$ following Eq. 14. At intermediate values of $\chi_R$ (approximately 2), the curves decline as $O(\chi_R^{-1})$, which means that the dispersion is controlled by convective rotation, i.e., $\sigma^{swim}$ can be approximated to $-n\zeta U_0^2\tau_R\chi_R^{-1}$ or $-n\zeta U_0^2/\Omega_c$. The diffusivity continues to decay at high $\chi_R$ following Eq. 15. An interesting feature at high $\chi_R$ is the faster decay of $\sigma_\parallel^{swim}$ as $O(\chi_R^{-3})$ compared to $\sigma_\perp^{swim}$ as $O(\chi_R^{-2})$. This difference can be explained by considering the driving force for dispersion, $\Delta u=\langle u\rangle-u(q)$. Gradients in $\Delta u$ determine the driving force for dispersion: $d\,\Delta u_\parallel/d\hat{\mu}$ approximates to $\chi_R^-$ and $d\Delta\, u_\perp/d\hat{\mu}$ approximates to $\chi_R^{-1/2}\hat{\mu}^{-1/2}$. The parallel direction has a small driving force for all $\hat{\mu}$ because an individual particle's instantaneous velocity is the same as the mean, $\langle u_\parallel\rangle$. A very large fluctuation is required to generate an appreciable contribution to the parallel diffusivity. In contrast, the gradient is maximized at $\hat{\mu}=0$ in the perpendicular direction because the mean transverse velocity is zero. A small fluctuation in the perpendicular direction contributes more to the dispersion than in the parallel direction, so $\sigma_\parallel^{swim}$ decays faster than does $\sigma_\perp^{swim}$.

Figure 6:
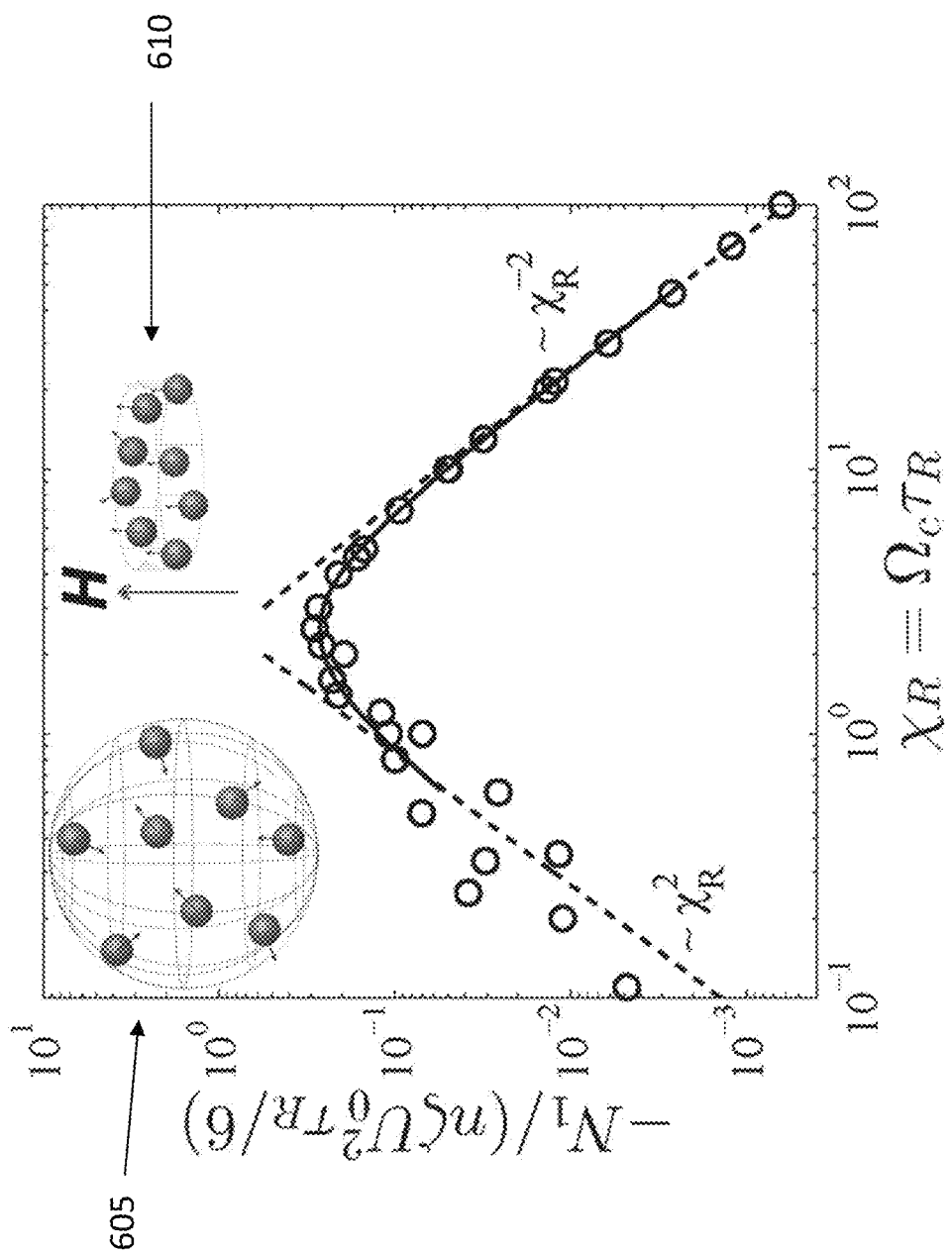
FIG. 6 illustrates the first normal swim-stress difference as a function of $\chi_R$.

FIG. 5 illustrates that the swim stress tensor is anisotropic, which allows the identification of the first normal swim-stress difference: $N_1=\sigma_\parallel^{swim}-\sigma_\perp^{swim}$. Remarkably, this normal swim-stress difference is a single particle property that arises uniquely from the biased motion of an active particle. As shown in FIG. 6, $N_1$ goes to zero for $\chi_R\to 0$ since the swim stress tensor becomes isotropic. $N_1$ also goes to zero for $\chi_R\to\infty$ because the swim stress decays to zero in both the parallel and perpendicular directions (see Eq. 15). $N_1$ reaches a maximum at intermediate values of $\chi_R$ owing to the rapid decay of the swim stress in the parallel direction ($\sigma_\parallel^{swim}$ approximates to $O(\chi_R^{-3})$). Due to axisymmetry the second normal swim-stress difference is zero for all $\chi_R$.

FIG. 6 illustrates the first normal swim-stress difference, $N_1=\sigma_\parallel^{swim}-\sigma_\perp^{swim}$, as a function of $\chi_R$. The circles are results from BD simulations, and the solid and dashed curves are the exact and asymptotic analytical solutions, respectively. The illustration shows an instantaneous configuration of the swimmers under a weak (605) and moderate (610) external field.

Figure 7:
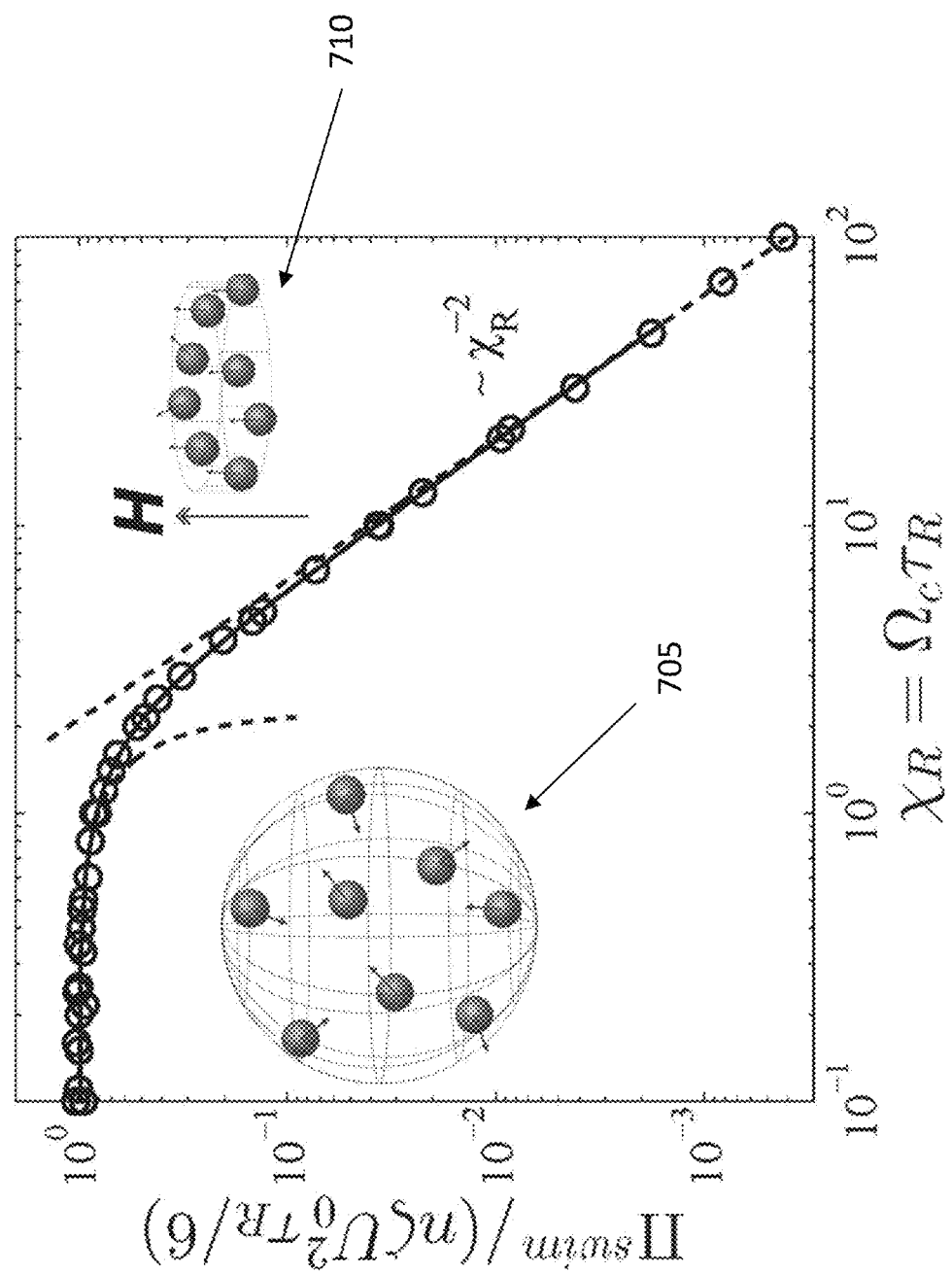
FIG. 7 illustrates the swim pressure as a function of $\chi_R$.

An anisotropic $\sigma^{swim}$ means that the confining force required to contain the swimmers by the bounding walls would be different in the parallel and perpendicular directions. The swim pressure represents the average of the normal swim stresses (i.e., confinement pressure) exerted on the bounding walls: $\Pi^{swim}=-\text{tr}\langle\sigma^{swim}\rangle/3$, see Ref. [2]. As shown in FIG. 7, the swim pressure approaches the "ideal-gas" value as $\chi_R\to 0$: $\Pi^{swim}=n\zeta U_0^2\tau_R/6$. At higher $\chi_R$, the swim pressure decreases since the external field confines the swimming trajectories along the field direction, reducing the confinement pressure on the surrounding walls.

FIG. 7 illustrates the swim pressure, $\Pi^{swim}=-\text{tr}\langle\sigma^{swim}\rangle/3$, as a function of $\chi_R$. The circles are results from BD simulations, and the solid and dashed curves are the exact and asymptotic analytical solutions, respectively. FIG. 7 shows an instantaneous configuration of the swimmers under a weak (705) and moderate (710) external field.

Since normal stress differences indicate how a soft material might elongate or shrink, results from FIGS. 6 and 7 can be exploited in the design of various novel active soft materials. Using the results described herein it is possible to now describe how a polymer network (e.g., a gel) loaded with active particles with uniform swim speeds behaves in the presence of an external field. In the absence of the external field, the active particles exert an equal magnitude of normal stress in all directions of the gel, namely $\sigma^{swim}=-n\zeta U_0^2\tau_R I/6$. Upon turning on the external field, the gel shrinks due to the decrease in swim pressure (see FIG. 7), assumes the shape of a thin 3D disk due to the negative normal stress difference (see FIG. 6), and the gel translates due to the average velocity of the swimmers (see FIG. 4). Such a device can be used as a mechanical device/motor where its shape, size, and motion can be carefully tuned by an external field. The gel behavior discussed above (FIG. 1) is for non-uniform swim speeds of the particles, which were discussed above. It is important to note that if one can measure the effective translational diffusivity of active particles in an orienting field, then the stress is known from the relationship $\sigma=-n\zeta\langle D\rangle$. It is thus possible to make predictions of the shape and size of the gel based upon a simple diffusivity measurement of the swimmers.

The nonuniform swimming velocity can be calculated as follows. The swimming speeds of bacteria have been shown to change when exposed to chemical (see Ref. [22]) and thermal (see Ref. [23]) gradients. To this end, the effects of nonuniform swimming speeds on the swim stress and the average translational velocity and diffusivity can be considered. Specifically, the swimmers' speed is allowed to vary with the swimmers' orientation relative to the external field, $\hat{H}\cdot q$. Considering the swimming velocity $$u(q)=q(1+u'(\alpha H_0\hat{H}\cdot q)), \tag{18}$$

where $u'(\alpha H_0\hat{H}\cdot q)$ is a dimensionless perturbed velocity relative to the uniform speed, $U_0$, it is possible to introduce $\alpha$ as an intrinsic particle property relating the external field strength, $H_0$, to the translational velocity.

The $g_0$ solution is identical to Eq. 16 since the orientation distribution is independent of $u(q)$. However, the d-field differs because the driving force $\Delta u=\langle u\rangle-u(q)$ is different. Eq. 12 now becomes $$\nabla_q^2 d-\chi_R\nabla_q\cdot[(q\times\hat{H})d]=-g_0[\langle u\rangle q(1+u'(\alpha H_0\hat{H}\cdot q))], \tag{19}$$

where $$\langle u\rangle=\oint g_0[q(1+u'(\alpha H_0\hat{H}\cdot q))]dq. \tag{20}$$

The swim diffusivity and stress become $$\sigma^{swim}=-n\zeta\langle D^{swim}\rangle=n\zeta U_0^2\tau_R u\rangle-q(1+u'(\alpha H_0\hat{H}\cdot q))]\,ddq. \tag{21}$$

Eqs. 19-21 are the only changes required to account for nonuniform swimming speeds, compared to the expressions for uniform swimming speeds. With a choice of $u'(\alpha H_0\hat{H}\cdot q)$, the problem statement is complete. Here a linear relationship can be considered for the velocity perturbation: $u'(\alpha H_0\hat{H}\cdot q)=\alpha H_0\hat{H}\cdot q$. A swimmer's velocity is now $$u(q)=q[1+\alpha H_0(q\cdot\hat{H})], \tag{22}$$

which may be a more complete description than the uniform-speed case considered earlier. When oriented along $\hat{H}$, the swimmer increases its speed, and when oriented antiparallel to $\hat{H}$, it decreases its speed.

Substituting Eqs. 22 and 16 into Eq. 20, the average velocity is $$\langle u\rangle=\hat{H}[\coth\chi_R-\chi_R^{-1}+\alpha H_0(1-2\chi_R^{-1}\coth\chi_R+2\chi_R^{-2})]. \tag{23}$$

Comparing with Eq. 17, it is possible to see that the average velocity increases by the last term in parentheses on the right-hand side of Eq. 23. At low $\chi_R$, the mean velocity of the swimmers is $$\langle u \rangle = \hat{H}\left(\frac{\alpha H_0}{3} + \frac{\chi_R}{3} + \frac{2}{45}\alpha H_0 \chi_R^2 + O(\chi_R^3)\right). \quad (24)$$

The first term on the right-hand side represents a mean drift velocity arising from the perturbed velocity. At high $\chi_R$, the swimmers are strongly oriented along the field direction, therefore the average velocity approaches $U_0(1+\alpha H_0)$ following Eq. 22.

An analytic solution of Eq. 19 for arbitrary $\chi_R$ and $\alpha H_0$ is described below, but it is also possible to analyze the behavior at low and high $\chi_R$. For small $\chi_R$, a regular perturbation scheme gives the swim stress $\sigma^{swim} = -n\zeta[\langle D_\parallel^{swim}\rangle \hat{H}\hat{H} + \langle D_\perp^{swim}\rangle (I-\hat{H}\hat{H})]$, where $$\langle D_\parallel^{swim} \rangle = \quad (25)$$
$$U_0^2 \tau_R \left[\left(\frac{1}{6} + \frac{2}{135}(\alpha H_0)^2\right) + 2\frac{\chi_R}{27}\alpha H_0 - \chi_R^2\left(\frac{7}{135} - \frac{(\alpha H_0)^2}{189}\right)\right] + O(\chi_R^3),$$

$$\langle D_\perp^{swim} \rangle = \quad (26)$$
$$U_0^2 \tau_R \left[\left(\frac{1}{6} + \frac{1}{90}(\alpha H_0)^2\right) + \frac{\chi_R}{18}\alpha H_0 - \chi_R^2\left(\frac{1}{40} - 59\frac{(\alpha H_0)^2}{22680}\right)\right] + O(\chi_R^3).$$

As $\alpha H_0 \to 0$, the results reduce to the uniform-speed solution considered earlier herein. An important feature is that the dispersion increases at small $\chi_R$, unlike the uniform-velocity case (compare with Eq. 14). Since the swimmers oriented towards the field move faster than those oriented away from the field, it is possible to see an enhanced dispersion (and swim stress) at low to intermediate $\chi_R$. As can be seen from the exact solution described below, the swim stresses in both parallel and perpendicular directions continue to increase and reach a maximum at intermediate $\chi_R$.

Another key difference compared to the uniform speed case, is the anisotropic swim stress at $\chi_R=0$; the parallel diffusion is larger (2/135 versus 1/90 for $\alpha H_0=1$). The average drift velocity from Eq. 24 increases the effective translational diffusivity above $U_0^2\tau_R/6$ even at $\chi_R=0$. This drift velocity may help explain the observed migration of bacteria along a temperature gradient, see Ref. [21].

At high $\chi_R$, the behavior is similar to the uniform-velocity case. Since all particles are oriented along the external field, the effect of swimming-speed nonuniformity becomes negligible and the particles swim in the same direction with the same speed. The swim stress at high $\chi_R$ is $$\sigma^{swim} = \quad ((27))$$
$$-n\zeta U_0^2\tau_R\left[\frac{1}{2}(1+2\alpha H_0)^2\chi_R^{-3}\hat{H}\hat{H} + (1+\alpha H_0)^2\chi_R^{-2}(I-\hat{H}\hat{H})\right].$$

Figure 8:
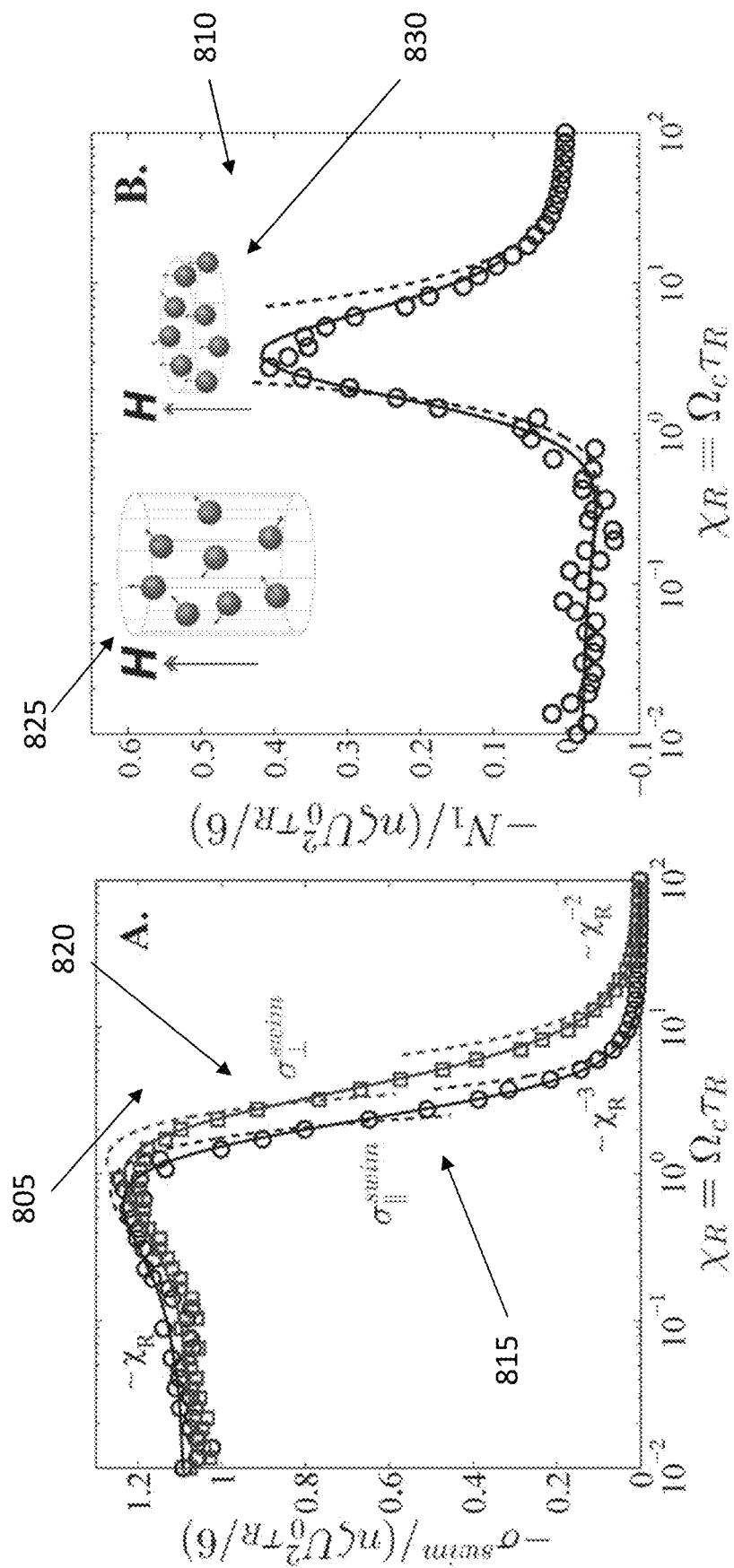
FIG. 8 illustrates the swim stress for nonuniform swimming speeds.

FIG. 8 illustrates the swim stress for nonuniform swimming speeds: (A, 805) The swim stress is plotted in the parallel (815) and perpendicular (820) directions as a function of $\chi_R$ for $\alpha H_0=1$. The $\alpha H_0$ parameter allows the swimming speed to vary with particle orientation. (B, 810) The first normal swim-stress difference is plotted. FIG. 8 shows an instantaneous configuration of the swimmers under a weak (825) and moderate (830) external field. In both (A) and (B), the solid curves are the exact solutions, and the dashed curves are the asymptotic solutions. In (A) BD simulation results are shown in circles and squares for the parallel and perpendicular directions, respectively.

The swim stress as a function of $\chi_R$ for $\alpha H_0=1$ is shown in FIG. 8, (805). The instantaneous swimming speed is twice the uniform speed when the swimmer is oriented along the field ($2U_0$) and zero when oriented in the opposite direction. The swim stress increases at low to moderate $\chi_R$ and reaches a maximum at $\chi_R^{max}=0.60$ and $\chi_R^{max}=0.95$ in the parallel and perpendicular directions, respectively. It is possible to see maxima because the field redistributes the orientations and modifies the swimming speeds. This is different from the uniform-speed case where the field affected only the swimming orientations. As shown in FIG. 8, (810), the normal swim-stress difference is non-monotonic and also changes in sign from negative to positive at $\chi_R$ equal to approximately 0.8.

Figure 9:
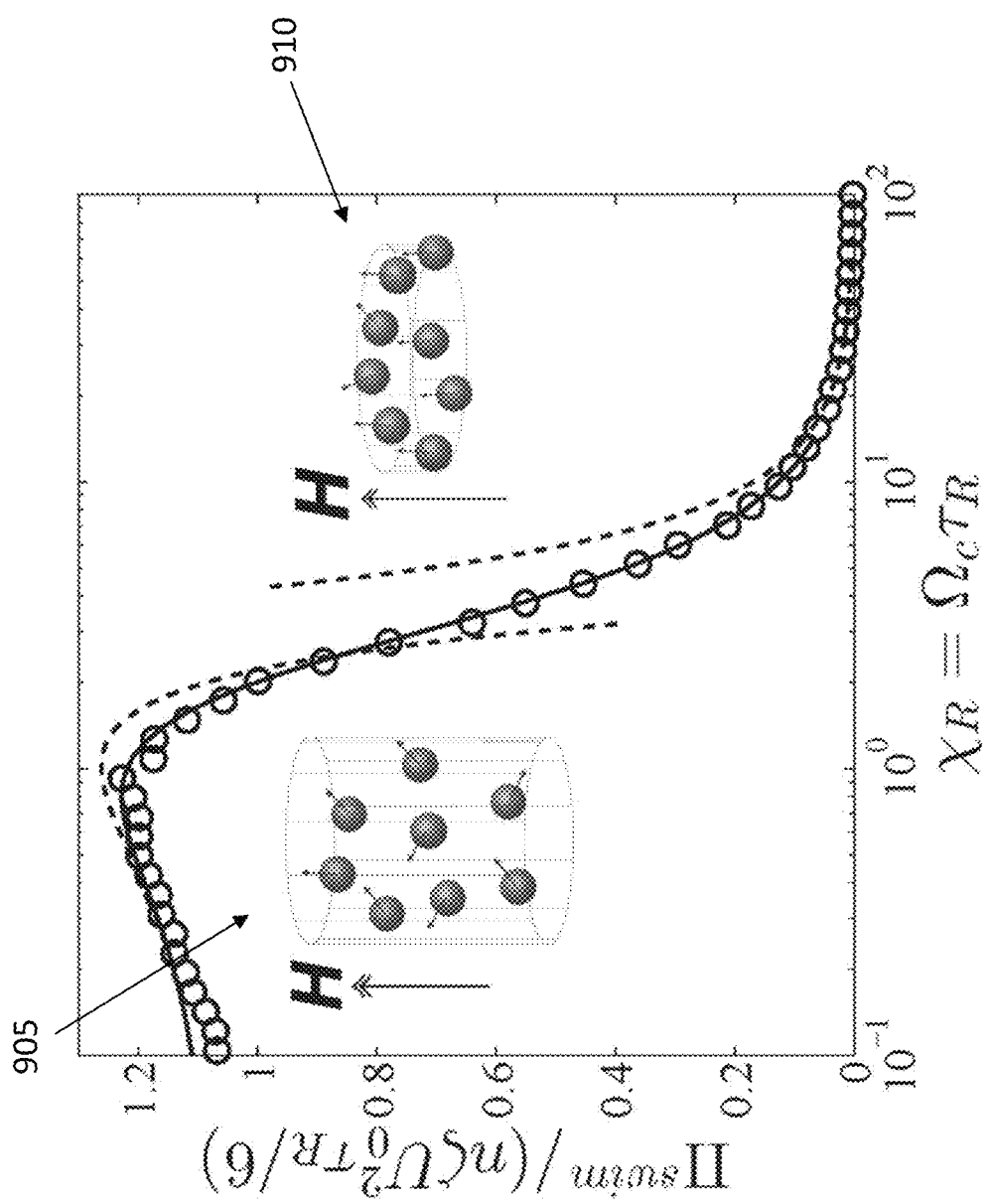
FIG. 9 illustrates the swim pressure as a function of $\chi_R$ for $\alpha H_0 = 1$.

In FIG. 7 it is illustrated that an external field that affects the particles' swimming orientation (but not their speed) results in a monotonically decreasing swim pressure with $\chi_R$. As shown in FIG. 9, the swim pressure becomes non-monotonic when both the particles' swimming orientation and speed are affected by the external field. This feature is interesting because an external field can give a non-monotonic pressure profile at the single-particle level (i.e., an infinitely dilute system).

In the present disclosure above it was discussed an embodiment of loading a soft, compressible gel with active particles. When the colloidal particles are inactive, the gel assumes some equilibrium shape as shown in FIG. 1. Activating the colloidal particles causes the gel to swell due to the "ideal-gas" swim pressure of the active particles, $\Pi^{swim}=n\zeta U_0^2\tau_R/6$. Since the shear modulus of polymer networks can be adjusted over a wide range (in principle to nearly zero) and the intrinsic activity of the swimmers can be made much larger than the thermal energy, $\zeta U_0^2\tau_R \gg k_B T$, the swim pressure can make an appreciable contribution to the overall size of the gel.

When a weak external field (i.e., $\chi_R<1$) is applied, the gel expands even more due to increased swim pressures (see FIG. 9), elongates due to positive normal stress differences (see FIG. 8, (810)), and translates due to the net motion of the active swimmers (see Eq. 24) within the gel. When the external field strength is increased ($1<\chi_R<<\infty$), the swim pressure decreases and the normal stress difference becomes negative (FIG. 8, (810) graphs $-N_1$), which causes the gel to shrink in size, translate faster towards the field direction, and assume the shape of a thin disk as shown in FIG. 1. When the external field strength becomes very high ($\chi_R \to \infty$), the normal swim-stress difference and swim pressure vanish, causing the gel to return to its equilibrium shape and size but translate in the field direction. When the external field is turned off, the gel stops translating and an entire cycle is completed as depicted in FIG. 1. Each transformation of the gel is corroborated by the calculations and BD simulations as described herein.

FIG. 9 illustrates the swim pressure as a function of $\chi_R$ for $\alpha H_0=1$. The swim pressure, $\Pi^{swim}=-\text{tr }\sigma^{swim}/3$, is plotted as a function of $\chi_R$ for $\alpha H_0=1$. The circles are results from BD simulations, and the solid and dashed curves are the exact and asymptotic analytical solutions, respectively. FIG. 9 shows an instantaneous configuration of the swimmers under a weak (905) and moderate (910) external field.

Allowing the swimming speeds to vary with orientation introduces features similar to the sedimentation problem considered by Brenner, see Ref. [14], and Almog and Frankel, see Ref. [15]. In the effective translational diffusivity (Eqs. 25 and 26), the terms involving $(\alpha H_0)^2$ are identical to those by Almog and Frankel, see Ref. [15]. When analyzing the motion of a single particle, there is no distinction between a motion caused by an external force (i.e., gravity) and a motion arising from intrinsic particle activity (i.e., swim force). Therefore, the perturbation $u'=\alpha H_0 \hat{H} \cdot q$ in the modified velocity expression is similar to adding a contribution from an external force, $M(q) \cdot F^{ext}$, where M (q) is the orientation-dependent mobility and $F^{ext}$ is the external force. It is also possible to assume an expression of $u'(\alpha H_0 \hat{H} \cdot q)$ that is different from the linear relationship (Eq. 22) considered here, and the results would no longer be the same as the sedimentation problem. Therefore, for a single particle the sedimentation problem is a special case of our general formulation.

The present disclosure describes a new approach to understand and compute the active stress in a system of self-propelled bodies. All active matter systems generate a unique swim pressure through their intrinsic self-motion. This swim stress perspective is applied here to analyze the effect of an external field on the motion and deformation of active matter. The present disclosure describes that the external field engenders anisotropic stresses, meaning that the swimmers experience a different confining force in the parallel and perpendicular directions. This feature leads directly to the shrinking/expanding, elongating, and translating of soft, compressible materials that are loaded with active particles. The external field can thus be used to manipulate the shape and size of soft materials such as a gel or perhaps a biological membrane. Another important application may be the analysis of various biophysical systems, such as the interior of a cell. Molecular motors that activate the cytoskeleton must exert a swim pressure on the cell owing to their self-motion along a track.

The analysis described herein remains valid for non-spherical particles with a varying swim velocity $U_0$ and/or reorientation time $\tau_R$. The examples described herein comprised a dilute system of swimmers, but inclusion of two-body effects in the Smoluchowski Eq. 1 is also possible. For non-spherical particles the hydrodynamic drag tensor, $\zeta$, varies with the director q, and the effective hydrodynamic drag factor $\zeta^{eff}=(2\zeta_\perp+\zeta_\parallel)/3$ becomes the relevant quantity in the stress-diffusivity relationship, where $\zeta_\perp$ and $\zeta_\parallel$ are the transverse and parallel components of the hydrodynamic drag tensor, respectively. At finite volume fractions, the particle size, a, would enter in the form of a nondimensional rotary Peclet number, $Pe_R=U_0 a/\langle D^{swim}\rangle$ which can be approximated to $a/(U_0 \tau_R)$, and compares the swimmer size a to its run length $U_0\tau_R$. With the inclusion of translational Brownian motion, all three parameters can be varied in the analysis: $\chi_R=\Omega_c \tau_R$, $Pe_R=a/(U_0\tau_R)$, and the swim Peclet number $Pe_s=U_0 a/D_0$.

In the examples described herein, hydrodynamic interactions among the particles were neglected. These interactions would contribute additional terms to the active-particle stress and affect the reorientation time of the particles due to translation-rotation coupling. The swim stress is distinct and different from the "hydrodynamic stresslet," which is also a single-particle property but scales as $n\zeta U_0 a$, see Refs. [10, 11]. As mentioned herein, the motion of a single particle due to an intrinsic swim force and an external force are the same. At higher concentrations or when considering the swimmer's interactions with other bodies or boundaries a distinction can be made the intrinsic swim mechanism does not generate a long-range 1/r Stokes velocity field as does an external force.

The examples described herein relate to a dilute system of active particles, but at higher concentrations active systems have been known to exhibit unique collective behavior, see Refs. [1,29]. The swim pressure presented herein remains valid and appropriate for hydrodynamically interacting active systems, but it may be necessary to carefully examine the individual contributions to the active stress. A single particle hydrodynamic contribution to the stress is of the form $n\zeta aU$, which, while important, is much smaller by a factor of $U_0\tau_R/a$ than the swim pressure. A complete study would need to consider the effects of both the swim and hydrodynamic stresses.

Experimentally, the precise manipulation of colloids using external fields is critical in many applications, like the targeted transport and delivery of specific chemicals, see Ref. [30]. Active-matter systems are ideal candidates for understanding dynamic self-assembly and developing synthetic structures. For example, dipolar particles subjected to a magnetic or electric field have been shown to form patterns, see Refs. [30-32]. Self-assembly and clustering behavior in active matter have been analyzed from the swim stress perspective, see Ref. [2], and it would be possible to extend these ideas to self-propelled particles that are biased by an external orienting field.

In the following, some calculations are described related to equations deduced above in the present disclosure.

Low-$\chi_R$ limit. A regular perturbation expansion of Eqs. 11 and 12 assumes solutions of the form $g_0(q; \chi_R)=g_0^{(0)}(q)+g_0^{(1)}(q)\chi_R+g_0^{(2)}(q)\chi_R^2+O(\chi_R^3)$ and $d(q; \chi_R)=d^{(0)}(q)+d^{(1)}(q)\chi_R+d^{(2)}(q)\chi_R^2+O(\chi_R^3)$.

Substituting the above expressions into Eq. 11 of the text, the leading-order orientation distribution function $g_0^{(0)}$ satisfies $\nabla_q^2 g_0^{(0)}=0$ and $\oint g_0^{(0)} dq=1$. The solution is the uniform distribution, $g_0^{(0)}=1/(4\pi)$. The $O(\chi_R)$ problem is $-\hat{H}\cdot q/(2\pi)=\nabla_q^2 g_0^{(1)}$ with $\oint g_0^{(1)} dq=0$. From Ref. [27], vector spherical surface harmonics satisfy $$\nabla_q^2 P_n(q)=-n(n+1)P_n(q). \tag{A1}$$

It is hence possible to substitute the trial solution $g_0^{(1)}=P_1(q)\cdot a_1$ into Eq. A1, and obtain $a_1=\hat{H}/(4\pi)$. Thus, the solution is $g_0^{(1)}=\hat{H}\cdot P_1(q)/(4\pi)$. The $O(\chi_R^2)$ problem is solved similarly: $\nabla_q^2 g_0^{(2)}=-\hat{H}\hat{H}:P_2(q)/(2\pi)$ with $\oint g_0^{(2)} dq=0$. The solution is $g_0^{(2)}=\hat{H}\hat{H}:P_2(q)/(12\pi)$. By substituting these three contributions into the perturbation expansion, it is possible to arrive at the solution in the text.

A similar procedure for the d-field gives $$d=-\frac{1}{8\pi}P_1(q)-\frac{5\chi_R}{72\pi}\hat{H}\cdot P_2(q)+ \tag{A2}$$

$$\frac{\chi_R^2}{\pi}\left(\frac{29}{1440}\hat{H}\hat{H}\cdot P_1(q)-\frac{13}{720}\hat{H}\hat{H}:P_3(q)-\frac{3}{160}P_1(q)\right)+O(\chi_R^3).$$

As in the force-induced microrheology problem considered in Ref. [23], the O(1) solution for d is the same as the $O(\chi_R)$ problem for $g_0$. In the linear-response regime, the problems are identical whether the swimmers are reoriented by the external field ($g_0$) or by thermal energy $k_B T$ (d) and the same holds true when the reorientation is a thermal with $\tau_R$.

High-$\chi_R$ limit. The problem is singular in the $\chi_R \gg 1$ limit, so it is possible to expand the solution in the inner region as $g_0(\hat{\mu}; \chi_R) = \chi_R g_0^{(0)}(\hat{\mu}) + g_0^{(1)}(\hat{\mu}) + O(\chi_R^{-1})$. Substituting into Eq 11. of the text, the leading-order solution satisfies $$\frac{d}{d\hat{\mu}}\left[\hat{\mu}\left(g_0^{(0)} + \frac{dg_0^{(0)}}{d\hat{\mu}}\right)\right] = 0, \tag{B1}$$

with $\int_0^{2\pi}\int_0^\infty g_0^{(0)}(\hat{\mu})\, d\hat{\mu}\, d\phi = 1$. For the fluctuation field, it is possible to separate the solution into scalar components parallel and perpendicular to $\hat{H}$ as $d(\mu, \phi; \chi_R) = \chi_R) d_\parallel(\mu; \chi_R)\hat{H} + d_\perp(\mu; \chi_R)(e_x \cos\phi + e_y \sin\phi)$, where $e_x$ and $e_y$ are unit vectors in the x and y directions, respectively (see FIG. 3). It can be assumed, subject to a posteriori verification, that $d_\parallel$ and $d_\perp$ are only a function of pt. Substituting the scaled ft variable into Eq. 12, it is possible to obtain $$\frac{d}{d\hat{\mu}}\left[\hat{\mu}\left(d_\parallel + \frac{dd_\parallel}{d\hat{\mu}}\right)\right] = -\frac{1}{4\pi}e^{-\hat{\mu}}\chi_R' - 1)(\hat{\mu} - 1), \tag{B2}$$

$$\frac{d}{d\hat{\mu}}\left[\hat{\mu}\left(d_\perp + \frac{dd_\perp}{d\hat{\mu}}\right)\right] - \frac{d_\perp}{4\hat{\mu}} = \frac{\sqrt{2}}{4\pi}\chi_R^{-1/2}e^{-\hat{\mu}}\hat{\mu}^{1/2}. \tag{B3}$$

The leading nonzero solution is of order $O(\chi_R^{-1})$ for $d_\parallel$ and $O(\chi_R^{-1/2})$ for $d_\perp$. In the parallel direction, the solution is $d_\parallel(\hat{\mu}; \chi_R) = e(\text{ii } 1)/(4 \text{ it}) + O(\chi_R^{-2})$, which satisfies both the regularity and normalization conditions. In the perpendicular direction, it is possible to obtain $d_\perp(\hat{\mu}; \chi_R) = \chi_R^{1/2}\hat{\mu}^{1/2} e^{-\hat{\mu}}(\sqrt{2}\pi) + O(\chi_R^{-1})$.

Using boundary-layer coordinates, the effective translational diffusivity is computed from $$\langle D \rangle - D_0 = \langle D^{swim}\rangle = \pi U_0^2 \tau_R \int_0^\infty [2\chi_R^{-2}(1-\hat{\mu})d_\parallel \hat{H}\hat{H} + \sqrt{2}\chi_R^{-3/2}d_\perp \hat{\mu}^{1/2}(I-\hat{H}\hat{H})]d\hat{\mu}. \tag{B4}$$

Exact solution for arbitrary $\chi_R$: Uniform speeds. This solution can be found by rewriting Eq. 11 as $$\frac{d}{d\mu}\left[(1-\mu^2)\frac{dg_0}{d\mu}\right] - \chi_R\frac{d}{d\mu}[(1-\mu^2)g_0] = 0, \tag{C1}$$

where $\mu = \hat{H}\cdot q$.

Twice integrating and invoking the normalization and regularity conditions (finite $dg_0/d\mu$ and $g_0$ at $\mu = \pm 1$), it is possible to arrive at Eq. 16 of the text. The corresponding displacement field is broken into the parallel and perpendicular components. The solution in the parallel direction is $$d_\parallel(\mu; \chi_R) = \tag{C2}$$
$$\frac{e^{\mu\chi_R}}{8\pi(\sinh\chi_R)^2}\left[\cosh(\chi_R)\log\left(\frac{1-\mu}{1+\mu}\right) - \sinh(\chi_R)\log(1-\mu^2) + e^{\chi_R}Ei(-\chi_R(\mu+1)) - e - \chi REi\chi R 1 - \mu + A_\parallel\right]e\mu\chi R,$$

where $Ei(t)$ is the exponential integral $Ei(t) \equiv \int_{-\infty}^t e^{-\zeta}/\zeta\, d\zeta$, and $A_\parallel$ is the normalization constant:

$$A_\parallel = -\frac{\chi_R}{16\pi(\sinh\chi_R)^3} \tag{C3}$$
$$\int_{-1}^1 e^{\mu\chi_R}\left[\cosh(\chi_R)\log\left(\frac{1-\mu}{1+\mu}\right) - \sinh(\chi_R)\log(1-\mu^2) + \right.$$

-continued
$$e^{\chi_R}Ei(-\chi_R(\mu+1-e-\chi REi\chi R 1 - \mu\, d\mu.$$

In the perpendicular direction, the solution is expanded as $d_\perp = \sum_{n=1}^\infty C_n P_n^1(\mu)$. The coefficients $C_n$ can be found by solving a tridiagonal matrix problem:

$$-\frac{\chi_R(n+1)(n-1)}{2n-1}C_{n-1} + n(n+1)C_n + \frac{\chi_R n(n+2)}{2n+3}C_{n+1} = b_n, \tag{C4}$$

with $C_0 = 0$, and the forcing coefficients $b_n$ are given by $$b_n = -\frac{2n+1}{2n(n+1)}\int_{-1}^1 g_0(\mu; \chi_R)\sqrt{1-\mu^2}\, P_n^1\, d\mu. \tag{C5}$$

From Eq. 9, the swim diffusivity and stress are $$\sigma^{swim} = -n\zeta\langle D^{swim}\rangle = -n\zeta U_0^2 \tau_R \pi \int_{-1}^1 [2d_\parallel(\coth\chi_R - \chi_R^{-1} - \mu)\hat{H}\hat{H} + d_\perp\sqrt{1-\mu^2}(I-\hat{H}\hat{H}d\mu, \tag{C6}$$

where only the diagonal terms contribute to the quadrature. In the perpendicular direction, the convenience of using associated Legendre polynomials is evident in $$\sigma_\perp^{swim} = -n\zeta U_0^2 \tau_R \pi \int_{-1}^1 \sum_{n=1}^\infty C_n P_n^1(\mu) P_1^1(\mu)\, d\mu \tag{C7}$$
$$= -\frac{4\pi}{3}n\zeta U_0^2 \tau_R C_1.$$

Exact solution for arbitrary $\chi_R$: Nonuniform speeds. Resolving Eq. 19 into the parallel and perpendicular components, the exact d-field solution in the parallel direction is $$d_\parallel = \frac{e^{\mu\chi_R}}{8\pi(\sinh\chi_R)^2} \tag{D1}$$
$$\left\{\left(1 - 2\frac{\alpha H_0}{\chi_R}\right)\left[\cosh(\chi_R)\log\left(\frac{1-\mu}{1+\mu}\right) - \sinh(\chi_R)\log(1-\mu^2) + \right.\right.$$
$$e^{\chi_R} Ei(-\chi_R(\mu+1)) - e - \chi REi\chi R 1 -$$
$$\mu - 2\alpha H0\, \mu \sinh\chi R + A\|e\mu\chi R,$$

where $\tilde{A}_\parallel$ is found from the normalization constraint to be $$\tilde{A}_\parallel = -\frac{\chi_R}{16\pi(\sinh\chi_R)^3} \tag{D2}$$
$$\int_{-1}^1 e^{\mu\chi_R}\left\{\left(1 - 2\frac{\alpha H_0}{\chi_R}\right)\times\left[\cosh(\chi_R)\log\left(\frac{1-\mu}{1+\mu}\right) - \sinh(\chi_R)\right.\right.$$
$$\log(1-\mu^2) + e\chi R Ei - \chi R\mu + 1 -$$
$$e - \chi R Ei\chi R 1 - \mu - 2\alpha H0\, \mu \sinh\chi R\, d\mu.$$

Substitution of Eq. D2 into Eq. 9 gives the swim stress in the parallel direction.

In the perpendicular direction, the form of the solution is the same as the previously calculated Eq. C4, except the forcing coefficients $b_n$ are given by $$b_n = -\frac{2n+1}{2n(n+1)} \int_{-1}^{1} g_0(\mu; \chi_R)\sqrt{1-\mu^2} \, (1+\alpha H_0 \mu) P_n^1 \, d\mu. \quad \text{(D3)}$$

The tridiagonal matrix problem is solved for the coefficients $C_{n-1}$, $C_n$, and $C_{n+1}$. The effective translational diffusivity in the perpendicular direction is given by $$\langle D_\perp \rangle = 4\pi U_0^2 \tau_R \left( \frac{1}{3} C_1 + \frac{1}{5} \alpha H_0 C_2 \right), \quad \text{(D4)}$$

where the orthogonality of the associated Legendre functions $P_1^1 = \sqrt{1-\mu^2}$ and $P_2^1 = -3\mu\sqrt{1-\mu^2}$ has been used to evaluate the integral.

In some embodiments, a force is applied by the swimmers to the surface of the flexible enclosure that contains them. The force may be the same on each part of the surface, or may be different for different surfaces (parts of the surface). In this way, the enclosure may be isotropically expanded, or may be anisotropically expanded by a higher degree in one direction, compared to another direction. Since the self-propelled bodies are within the enclosure, the force is directed outwardly, relative to the enclosure.

In some embodiments, the self-propelled bodies may be Janus particles. Janus particles are a type of nanoparticle with a surface that has two or more distinct physical properties. For example, each surface may allow a different type of chemistry interaction to occur on the same nanoparticle. In some embodiments, a Janus nanoparticle comprises two distinct parts, each made of a different material, or functionalized with different functional groups. For example, a Janus nanoparticle may have one-half of its surface hydrophilic and the other half hydrophobic.

In some embodiments, confinement of living bacteria and self-propelled Janus particles by an external potential trap provides a means of analyzing the run-and-tumble dynamics and motion of living systems. For example, an acoustic trap may be employed.

Acoustic traps or tweezers allow control of the movement of objects by sound waves. In a standing acoustic field, objects will experience an acoustic radiation force that moves the objects to special regions of the acoustic field. Depending on the properties (density, compressibility) of the objects, they can be moved to either acoustic pressure nodes (minimum pressure regions) or pressure antinodes (maximum pressure regions). As a result, precise manipulation of objects using sound waves is feasible by controlling the position of pressure nodes.

Developing a trap with a trapping radius large compared to the swimmers' size and run length is challenging, however standard optical traps are normally too weak. The present disclosure describes an acoustic trap strong enough to confine swimmers over large displacements. The restricted motion of the swimmers inside the trap was measured to investigate the unique mechanical pressure generated by active systems such as the flexible membranes filled with swimmers, as described in the present disclosure. Through their activity, all active systems exert a unique 'swim pressure' originating from the force required to confine them by boundaries, similar to molecular gases that collide into the container walls to exert a pressure or to the osmotic pressure exerted by solute molecules. The external potential trap behaves as an 'osmotic barrier' that confines the swimmers inside the trapping region, and a simple measurement of the swimmers' motion gives the swim pressure. During the experiment described herein, a strong trapping force was applied, to collect the swimmers into a close-packed active crystal. The acoustic trap was then turned off, causing the active crystal (the structure formed by the swimmers) to 'explode' due to an imbalance of the active pressure. All experimental results were corroborated by Brownian dynamics simulations and analytical theory.

Active matter systems such as swimming bacteria and synthetic catalytic Janus motors exhibit intriguing phenomena owing to their self-motion. Indeed, active systems of all scales generate a unique 'swim pressure' that impacts their large-scale phase behavior, see Ref. [2]. The origin of the swim pressure is based on the fact that all active bodies exert a mechanical, self-propulsive force on the surrounding boundaries that confine them, similar to the osmotic pressure of colloidal or molecular solutes in solution. Although many theoretical studies, see Refs. [2, 33-37], have analyzed the mechanical pressure generated by active matter, there is a dearth of experimental corroboration except for a recent study on sedimentation, see Ref. [38].

In the experiment described below, a dilute system of self-propelled Janus particles was confined in an acoustic tweezer to experimentally analyze the motion and mechanical pressure exerted by active matter. The harmonic trapping of active particles has been analyzed theoretically, see Refs. [39-41], but developing a trap with a trapping radius large compared to a swimmer's size and/or run length has remained an experimental challenge because standard optical tweezers are normally too weak (optical traps typically have about pN trapping forces and ≤µm particle displacements), see Ref. [42]. This challenge was overcome by developing a powerful acoustic trap to confine swimmers over large displacements, O(100 µm). The confinement provided by the trap behaves as an 'osmotic barrier' used classically to compute the osmotic pressure of Brownian suspensions. By analyzing the swimmers' restricted motion inside the trap, it is possible to directly compute the swim pressure of active systems, and also reproduce a classical textbook problem of diffusion from a point source. A new method is introduced to measure the effective diffusivity of a system of self-propelled particles. The measurements presented here provide empirical support for the design of novel active soft-matter materials using the principles of swim pressure, see Ref. [33].

Janus particles (made of platinum/sulfate latex) were fabricated. These particles could swim in two dimensions (2D) in hydrogen peroxide solution via diffusiophoresis, see Refs. [43, 24]. These self-propelled spheres translate with an intrinsic swim velocity $U_0$, tumble with a reorientation time $\tau_R$, and experience a hydrodynamic drag $\zeta$ from the surrounding continuous Newtonian fluid. The tumbling of the swimmer results in a random-walk process for $t > \tau_R$ with diffusivity $D^{swim} = U_0^2 \tau_R / 2$ in 2D. This entropic, random-walk process causes to the swimmer to exert the 'ideal-gas' swim pressure $\Pi^{swim} = n\zeta D^{swim} = n\zeta U_0^2 \tau_R / 2$, see Ref. [2]. Active synthetic Janus particles were chosen as a model living system, but the tweezer setup described herein can accommodate bacteria and other biological micro-swimmers.

To confine the swimmers a custom-built acoustic tweezer trap was developed, capable of exerting a Gaussian trap force with spring constant k and width w, $F^{trap}(r) = -kr \exp(-2(r/w)^2)$, which is well-approximated by a harmonic trap with $F^{trap}(r) = -kr$ for small departures $r \ll w$. When the acoustic tweezer is turned on, the swimmers are effectively confined because they cannot travel any further when the magnitude of their self-propulsive force equals that of the trapping force, $F^{trap}(r)=F^{swim}=\zeta U_0$. For a harmonic trap the swimmers are confined within a radius $R_c=\zeta U_0/k$ of the trap center. The positions and mean-square displacement (MSD) of the swimmers were measured as they were confined to stay within the trapping region.

Figure 10:
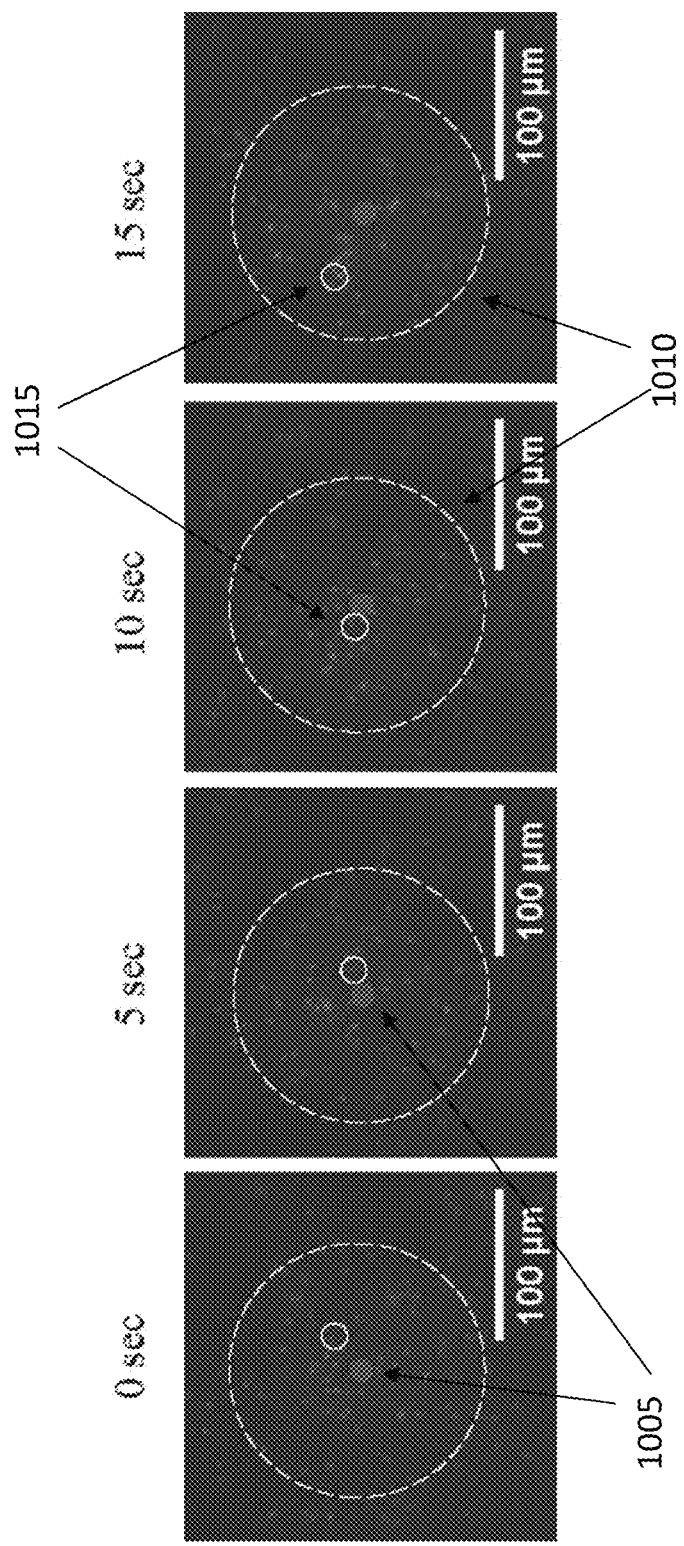
FIG. 10 illustrates snapshots of the confined swimmers that are still able to run and tumble freely inside the trapping region.

The trap stiffness was varied to interrogate the motion of the confined swimmers inside the trap. Since our goal is to observe the influence of the trap on the run-and-tumble motion of the swimmers, the focus was on weak traps to allow the swimmers to explore the entire trapping region (while having a trap strong enough to fully confine the swimmers). FIG. 10 illustrates snapshots of the confined swimmers that are still able to run and tumble freely inside the trapping region.

FIG. 10 illustrates snapshots of 3 μm trapped swimmers in an acoustic tweezer. The solid spot (1005) indicates the trap center and the large dashed white circle (1010) delineates the outer edge of the well. The swimmer (1015) shown inside the solid white circle (1010) undergoes a run-and-tumble motion while exploring the confines of the trap.

In addition to experiments 2D Brownian dynamics (BD) simulations were conducted. The nondimensional trap stiffness, $\alpha \equiv (U_0\tau_R)/R_c = k\tau_R/\zeta$ was varied; this parameter dictates the behavior of the swimmers inside the trap. For a weak trap $\alpha<1$ the swimmers are allowed to explore and reorient freely before reaching the 'ends' of the well; the maximum density occurs at the trap center $r=0$. For a strong trap $\alpha>1$ the swimmer sees the ends of the well before it is able to reorient (i.e., $R_c < U_0 \tau_R$), therefore the swimmer will be stuck at $R_c$ until it reorients and then run quickly to the other side and again wait there, see Ref. [40]. In this limit the maximum density occurs at $r=R_c$ and the swimmers' motion is not characterized by a well-defined swim diffusivity $D^{swim}=U_0^2\tau_R/2$. The swimmers' translational Brownian diffusivity $D_0=k_B T/\zeta$ is small compared to $D^{swim}=U_0^2\tau_R/2$, so translational diffusivity is neglected in the analyses.

A Brownian particle confined in a harmonic trap has the familiar Boltzmann probability distribution P(r) proportional to $\exp(-V(r)/(\zeta D))$, where D is the translational diffusivity. Since the run-and-tumble of an active swimmer can be interpreted as a random walk, the distribution of swimmers in a trap is also a Boltzmann distribution with the swim diffusivity $$D = D^{swim} = U_0^2\tau_R/2; P(r) = \frac{k}{\pi\zeta U_0^2\tau_r}\exp\left(-k\frac{r^2}{\zeta U_0^2\tau_R}\right), \quad (28)$$

or by nondimensionalizing distance with the run length, $P(r)(U_0\tau_R)^2=(\alpha/\pi)\exp(-\alpha r^2)$, where $\alpha \equiv k\tau_R/\zeta$. This is valid for $\alpha \leq 1$ since the swimmers must be allowed to undergo a random walk process within the confines of the well, see Refs. [39, 41]. This is corroborated by FIG. 11, (1105), where the analytical theory Eq. 28 agrees very well with both the experiments and BD simulations. The uniform probability far away from the trap $P(\infty)$ has been subtracted in the experiments.

Figure 11:
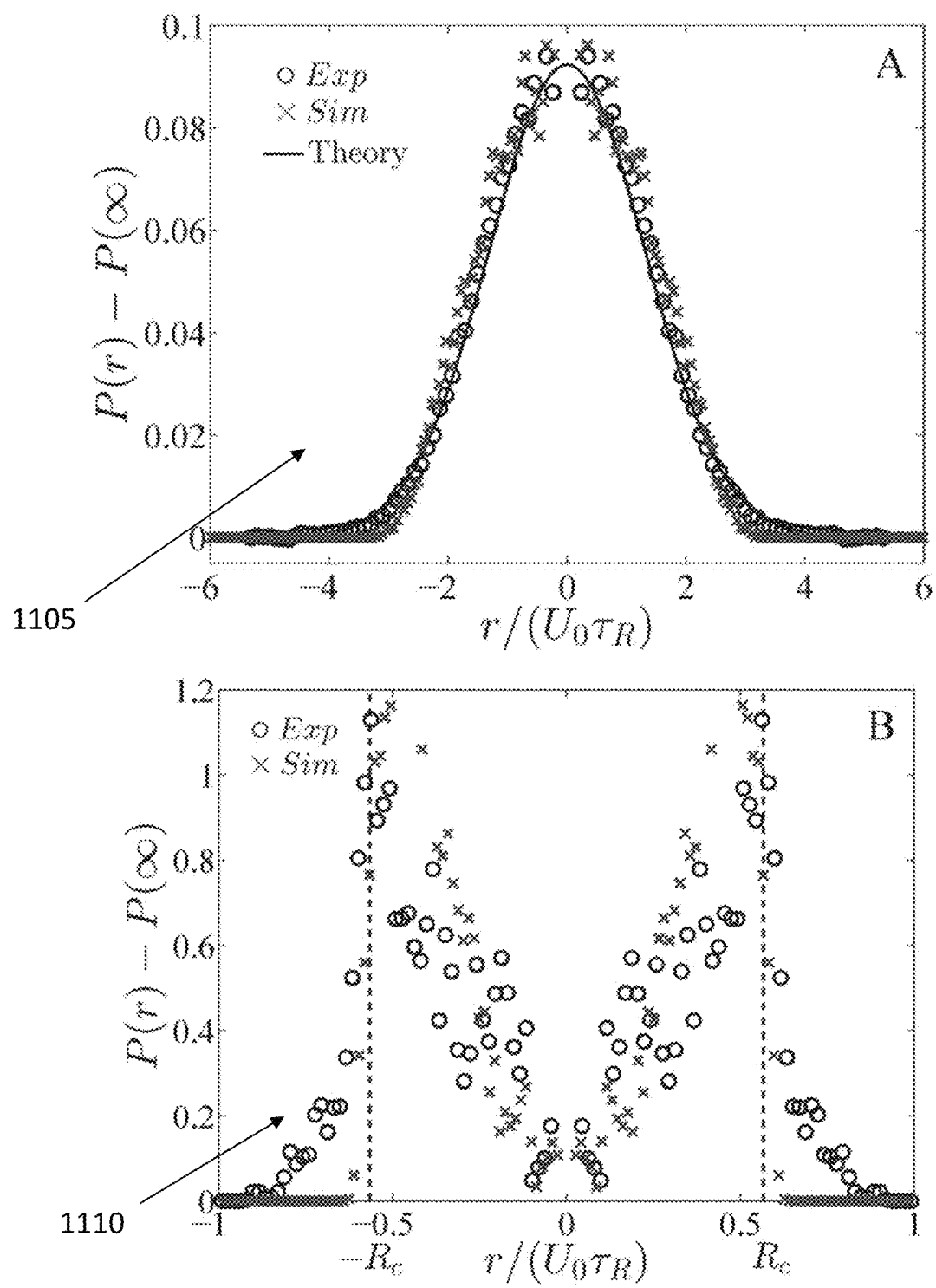
FIG. 11 illustrates the probability distribution of trapped active Janus particles as a function of distance from the trap center.

FIG. 11 illustrates the probability distribution of trapped active Janus particles as a function of distance from the trap center, comprising both experiment and BD simulations. In (1105), 2 μm diameter swimmers with $\alpha \equiv k\tau_R/\zeta=0.29$ follow a Boltzmann distribution (solid black curve is the analytical theory of Eq 1). In (1110), 3 μm diameter swimmers with $\alpha=1.76$ have a symmetric bimodal distribution, and the probability decreases to zero for $r>R_c=\zeta U_0/k$ (dashed black lines). The data are reflected about the origin at $r=0$.

In the other limit of large α the swimmers see the ends of the trap before reorienting, so the swimmers get stuck at $r=R_c$. As shown in FIG. 11 (1110) there is a peak in the probability distribution at $R_c=\zeta U_0/k$, and the Boltzmann distribution no longer applies. For $r>R_c$ the probability decreases sharply because the swimmers cannot get past the ends of the well. Thus to be Brownian-like the spring must be weak, i.e., $$\alpha \equiv \frac{k\tau_R}{\zeta} < 1,$$

so that the particle will undergo a random walk before it discovers the ends of the well.

The swim pressure can physically be interpreted as the force an active particle exerts on a boundary divided by the surface area, $\Pi^{swim}=F^{wall}/A$. It is an entropic quantity that all self-propelled bodies exert as a result of their self-motion. The acoustic trap behaves as an invisible 'boundary' that confines the swimmers. Having no physical wall present allows the preclusion of swimmer-wall hydrodynamic interactions that can be difficult to incorporate into the model.

Figure 12:
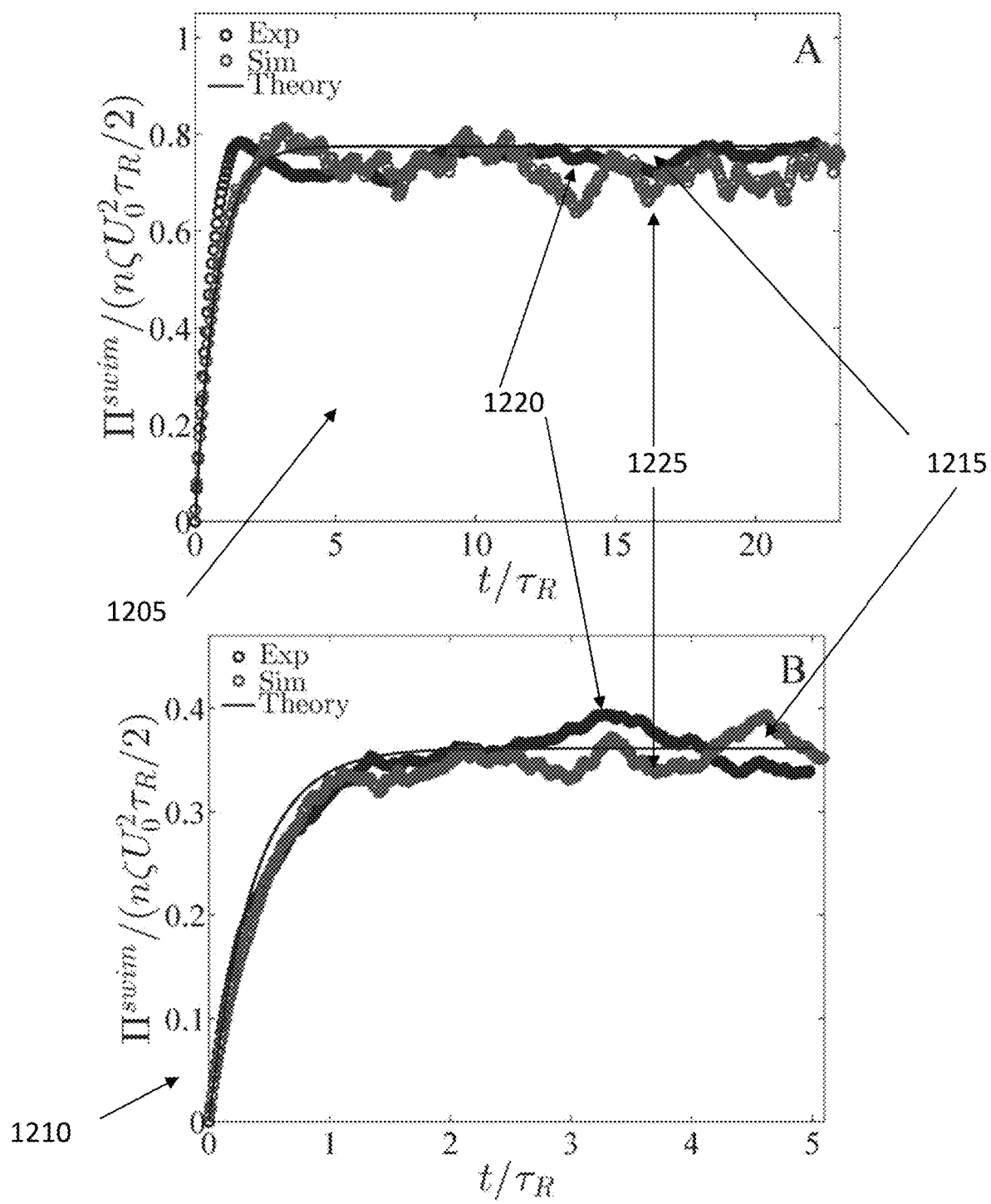
FIG. 12 shows the swim pressure computed in the experiments and BD simulations.

FIG. 12 illustrates the swim pressure of (1205) 2 μm diameter swimmers with $\alpha=0.29$ and (1210) 3 μm diameter swimmers with $\alpha=1.76$. The solid black curve (1215) is the theoretical prediction with a harmonic trap approximation, and the results from experiments (1220) and BD simulations (1225) are also plotted.

As described in the present disclosure, the swim pressure at steady-state can be obtained directly by measuring the MSD of the swimmer inside a linear trap:

$$\frac{\Pi^{swim}}{n\zeta U_0^2\tau_R/2} = \alpha\langle x \cdot x \rangle. \quad (29)$$

where $\alpha \equiv k\tau_R/\zeta$ and x has been nondimensionalized as proportional to $U_0\tau_R$. This elegant result reveals that the mean-square displacement (MSD) contains information about the mechanical pressure exerted by self-propelled particles. Solving the Langevin equation analytically for a swimmer confined in a trap it is possible to obtain the theoretical prediction $$\frac{\Pi^{swim}}{n\zeta U_0^2\tau_R/2} = \frac{1}{1+\alpha}. \quad (30)$$

The swim pressure depends only on the parameter α, which is a ratio of the swimmers' run length $U_0\tau_R$ to the size of the trap $R_c=M_0/k$. Therefore this expression describes a container-size dependent swim pressure—for a weak trap $\alpha \to 0$ and it is possible to obtain the 'ideal-gas' swim pressure $n\zeta U_0^2\tau_R/2$, whereas a strong trap causes the fictitious 'container' to shrink and decrease $\Pi^{swim}$.

FIG. 12 shows the swim pressure computed in the experiments and BD simulations using Eq. 29. For small times the swim pressure has transient behavior and requires data for times $t>\tau_R$ to reach a steady-state. At steady-state all curves approach the expected swim pressure given by Eq. 30.

The agreement between theory, BD simulations, and experiment is excellent. As a swimmer wanders away from the trap center, it may explore regions of the trap that are not strictly in the linear Hookean regime. Therefore one may expect the MSD to be slightly higher than the linear theory. However, although the swimmer concentration away from the trap is dilute, near the trap center swimmers accumulate and cluster, which obstructs the motion of free swimmers trying to swim across to the other end of the trap, decreasing the MSD. Hydrodynamic interactions also play a role near the trap center where the density of swimmers is higher. The analytical theory is valid for a dilute system of swimmers in a linear harmonic trap without hydrodynamic interactions, these effects appear to cancel and the linear approximations are proficient. In addition to the MSD and Eq. 29 (which comes from a linear approximation to $F^{trap}$), it is also possible to compute the full correlation using a Gaussian $F^{trap}$ and the results have only minor quantitative differences.

In the experiments described herein the active Janus particles have a range of activity levels due to variations in the platinum coating during fabrication. With a weak trap strong swimmers are able to swim straight past the trap without getting confined, whereas the weaker swimmers struggle to escape the vicinity of the trap center. The swim pressure in FIG. 12 is scaled using the average activity of the swimmers that are confined to stay within the trapping region.

When a weak trap is present for a long time (≥20-30 min) there is a gradual accumulation of swimmers inside the trap because swimmers that are initially outside of the trap wander near the trap and become confined. This induces a slow variation in the number density inside the trap n(t) over time. A dilute system of swimmers was used (total area fraction $\phi_A \leq 0.001$) and the timescale for the change in number density (≥5 min) was large compared to the swimmers' reorientation time ($\tau_R \sim 0.5$-10 s). Since the important timescale in the problem is the swimmers' reorientation time $\tau_R$, data is only required over a timespan of several $\tau_R$ and the effect of swimmer accumulation is negligible in the results.

In the description of the experiment, thus far the focus has been on applying a weak trap to allow swimmers to explore the entire trapping region. With a strong trap all swimmers accumulate to the trap center and form a dense close-packed 2D crystal (1305 in FIG. 13). When the trap is suddenly turned off, the crystal quickly 'melts' or 'explodes' and the constituent particles swim away (1310 in FIG. 13).

Figure 13:
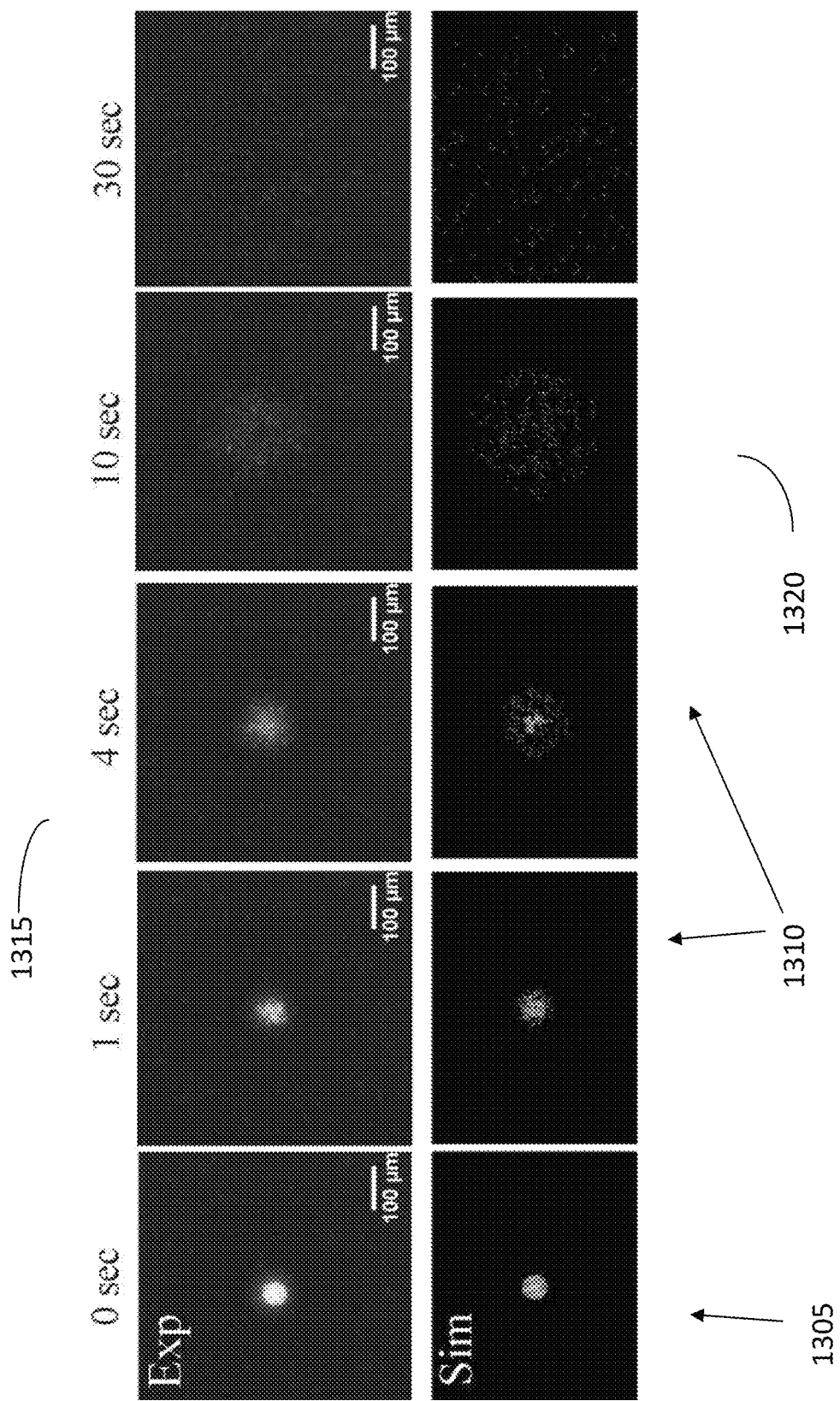
FIG. 13 illustrates snapshots of the melting process of the 'swimmer-crystal'.

FIG. 13 illustrates snapshots of the melting process of the 'swimmer-crystal,' in experiments (above, 1315) and BD simulations (below, 1320). A strong trapping force draws the swimmers into a dense close-packed 2D crystal (1305). A subsequent release of the trapping force frees the swimmers, causing the crystal to explode (1310). The spread of the particles is analogous to the classic problem of diffusion of a point source.

The swimmer-crystal explodes because the active pressure is large in the center and small far away. This spreading process is analogous to the classic diffusion of an instantaneous point mass, where the transient probability distribution P (r, t) is given by $$P(r, t) = \frac{1}{4\pi t D} \exp\left(-\frac{r^2}{4Dt}\right), \quad (31)$$

where t is the time after the point mass is introduced and D is the translational diffusivity of the constituent "solute" particles. For the swimmer-crystal, the diffusivity of the constituent particles is the swim diffusivity $D=D^{swim}=U_0^2\tau_R/2$. The results of theory, experiment, and BD simulations are shown in FIG. 14 at fixed times.

Figure 14:
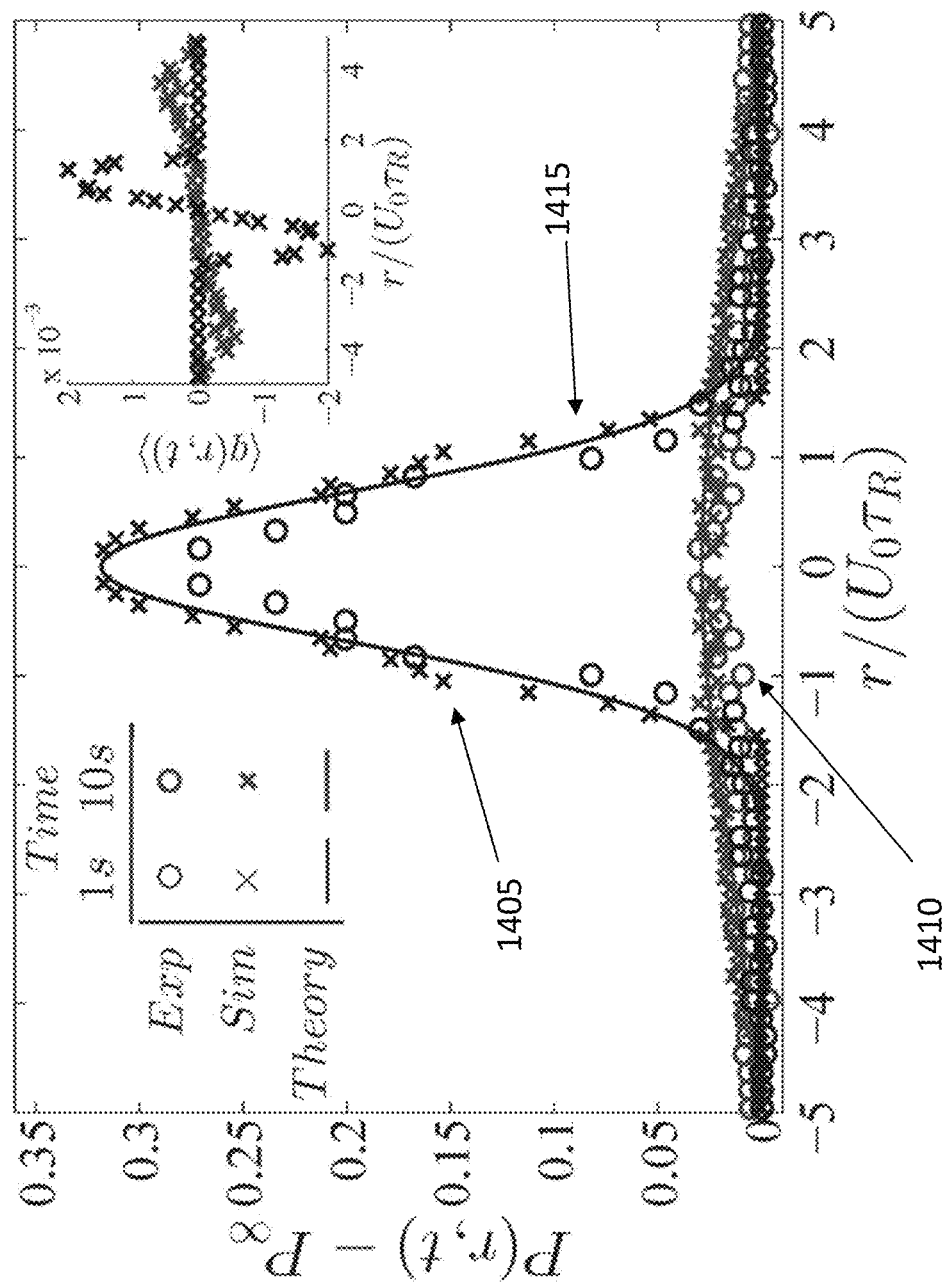
FIG. 14 illustrates the results of theory, experiment, and BD simulations at fixed times.

FIG. 14 illustrates the transient probability distribution of 2 µm swimmers as they melt from the crystal, drawn at two representative times after release (1405 and 1410 for 1s and 10s, respectively). The solid curves (1415) are the analytical theory of diffusion of a point source, and the circles and crosses are the experiment and BD simulation, respectively. The data are reflected about the origin at r=0. Inset shows the polar order of the swimmers $\langle q(r, t)\rangle$ as the peaks spread outward.

The data are in good agreement. The data near the trap center are difficult to acquire in the experiments (especially at short time) since the tracking algorithm cannot accurately differentiate between individual particles in the large crystal. At very short times, the point source solution does not accurately predict the experiment and BD simulations because of the finite size of the crystal. Theoretical prediction for diffusion of a step function (as opposed to a delta function) is more accurate at very short times after release, but after about 1s there is little difference between the two solutions. Even if individual particles cannot be tracked, this experiment provides a macroscopic method to measure the diffusivity of an active system using tweezers. The variance is related to the diffusivity by $L^2=2$ D t, so it is possible to measure the width of the spreading swimmer-crystal (ignoring details about the motion of individual swimmers) to infer the diffusivity from L proportional to √Dt.

This experiment shows the development of local polar order of the swimmers as they spread outward. Orientational polar order is established when the swimmers' motion is directionally aligned. The inset of FIG. 14 shows the average swimming orientation $\langle q(r, t)\rangle$ at two representative times. Local polar order is peaked along the perimeter of the crystal, and spreads radially outward with time like a wave front. This reveals that gradients in swimmer concentration can lead to local polar order, $\langle q(r, t)\rangle$ proportional to $-\nabla P(r, t)$. Thus this experiment may give further insight into the origin of polar order, how and why living organisms align, and the advantages of such collective behavior.

As described above, developing an external trap with a trapping radius large compared to active swimmers' size and run length has been an experimental challenge, as standard optical traps are normally too weak. An acoustic trap was developed, strong enough to confine self-propelled Janus particles over large displacements. The restricted motion of the Janus particles inside the trap was measured to investigate the unique mechanical pressure generated by active systems. The external potential trap behaved as an 'osmotic barrier' that confined the swimmers inside the trapping region, equivalent to molecular gases that collide into container walls or to solute molecules that push against a semipermeable membrane. Analytical theory for a dilute active system confined in a Hookean spring was used to derive a trap size-dependent swim pressure, which agreed well with experiment and BD simulations. It was discovered that a simple MSD measurement gives directly the 'ideal-gas' swim pressure exerted by an active system, $\Pi^{swim}=n\zeta U_0^2\tau_R/2$.

A strong trap was applied to collect the swimmers into a close-packed active crystal. When the trap was turned off the crystal 'exploded' due to an imbalance of the active pressure and the constituent swimmers diffused outward with their characteristic diffusivity $D^{swim}=U_0^2\tau_R/2$, similar to the classic diffusion of a point mass. It was found that gradients in swimmer concentration induced local orientational polar order that propagated outward with time.

The following describes some methods employed in the experiment described above. The Langevin equation for a dilute system of swimmers in a trap is given by $$0 = -\zeta U(t) + F^{swim} + F^{trap}, \quad (32)$$

where $U(t)$ is the velocity, $\zeta$ is the hydrodynamic drag factor, $F^{swim} \equiv \zeta U_0$ is the self-propulsive swim force of a swimmer, $U_0$ is the intrinsic swim velocity of an isolated swimmer, and $F^{trap} = -\nabla V(X)$ is the restoring force caused by the trap with potential $V(x)$. The left-hand side of Eq. 32 is zero because inertia is negligible for a colloidal dispersion.

Transverse trapping with an acoustic tweezer results in a Gaussian trap, see Ref. [44], with stiffness k and width w, $$F^{trap}(r) = -kr\exp\left(-2\left(\frac{r}{w}\right)^2\right)\hat{r},$$

which was independently verified. Passive Brownian particles were used to calibrate k and w of the acoustic trap by measuring the position and velocity of the particles in the trap. For a trap with large spatial extent (large w), the trapping force is well-approximated by a linear force $F^{trap}(r)$ proportional to $-kr\,\hat{r}$. As a swimmer wanders far away from the focus of the trap, there is a critical radius $R_c$ proportional to $\zeta U_0/k$ at which the swimmer cannot move any farther. At this position the swimmer's self-propulsive force $F^{swim}$ exactly cancels the trapping force $F^{trap}$ and the swimmer does not move. The swimmer is "stuck" in this position for a time of order $\tau_R$ until the swimmer changes its orientation.

Active Janus particles were fabricated from 2 and 3 μm diameter sulfate latex particles. Half of the particle surface was coated with a 7 nm-thick layer of platinum. When deposited in a hydrogen peroxide solution, the particles self-propel via diffusiophoresis in 2D at the air-water interface. The particles have a swim speed of 5-25 μm/s with a reorientation time of $\tau_R$=0.5-10 s, consistent with the Stokes-Einstein-Sutherland rotational diffusivity ($\tau_R$ proportional to $1/D_R$). The reorientation time was computed by analyzing the swimmers' orientation autocorrelation: $\langle(q(t)-q(0))^2\rangle = 2(1-\exp(t/\tau_R))$, where q(t) is the unit orientation vector of the swimmers. It was verified that the swimmers undergo a run-and-tumble motion characterized by the swim diffusivity $D^{swim}=U_0^2\tau_R/2$. The Stokes-Einstein-Sutherland translational diffusivity $D_0=k_BT/\zeta$ is negligibly small compared to $D^{swim}$.

To confine the swimmers in the transverse direction a custom-built acoustic tweezer setup was developed. A 0.25-inch diameter immersion type transducer was excited in sinusoidal signals at 25 MHz with variable voltages from 0-10 $V_{pp}$ using an AM300 Dual Arbitrary Generator. The transducer was inverted and held fixed in place throughout the experiment at a focal distance of 12 mm from the air-water interface using an XY positioner and a tilt stage. A 50× objective was connected to a sCMOS digital camera to obtain images and lighting was provided by a standard glass fiber ringlight.

The Janus swimmers were deposited on the air-water interface of a 0.5 wt % hydrogen peroxide solution, and their activity remained constant for at least 1 hour (each experimental run lasted a few minutes). The acoustic transducer was turned on and the motion of the swimmers was observed as they were transversely confined to stay within the trapping region. The acoustic tweezer exerts a Gaussian trapping force on the particles; the trap is well approximated by a linear Hookean spring force since the width w is large compared to the swimmers' run lengths. The center of the trap was identified at the end of each experiment by applying a strong trapping force to collect all of the swimmers to the trap center. A modified particle tracking script, see Ref. [45], was used in the analyses.

In the BD simulations the particles were evolved following Eq. 32. Although the concentration of swimmers far away from the trap center is dilute, an accumulation of swimmers may occur near the trap center which may obstruct the motion of free swimmers trying to swim across to the other end of the trap. To more accurately model the experimental system, the BD simulations included the interparticle force $F^P$ in Eq. 32. Nondimensionalizing the force by $\zeta U_0$, position by $U_0\tau_R$, and time by $\tau_R$, Eq. 32 (with the interparticle force) becomes $0=u(t)+q-F^{trap}+F^P$, where u is the particle velocity, $F^{trap}=-\alpha r\exp(-2\gamma^2 r^2)\,\hat{r}$ is the trapping force, $\gamma \equiv U_0\tau_R/w$ is a ratio of the swimmers' run length to the trap width, and $\alpha \equiv \tau_R/(\zeta/k)$ is a ratio of the swimmers' reorientation time to the timescale of the trap. The parameter $\alpha \equiv (U_0\tau_R)/(\zeta U_0/k)$ can also be interpreted as the ratio of the swimmers' run length to the 'size' of the container (set by the trap). A hard-disk interparticle force $F^P=F^{HS}$ was used to that prevent particle overlap in the simulations, see Refs. [46, 47]. The swimming orientation of the swimmers q=(cos θ, sin θ) was evolved following $$\frac{d\theta}{dt} = \sqrt{\frac{2}{\tau_R}}\Lambda(t)$$

where $\Lambda(t)$ is a unit random deviate.

The following describes the derivation of the swim pressure in a harmonic trap. For a harmonic trapping force $F^{trap}=-kx$, it is possible to solve Eq. 32 exactly for the position x(t) and compute the MSD:

$$\frac{\langle x(t)x(t)\rangle}{(U_0\tau_R)^2} = \frac{\left((-1+\alpha)-2\alpha e^{-\frac{(1+\alpha)t}{\tau_R}}+(1+\alpha)e^{-2\frac{t}{\tau_{trap}}}\right)}{\alpha(-1+\alpha^2)}\left(\frac{I}{2}\right), \quad (33)$$

where I is the isotropic tensor and $\tau_{trap} \equiv \zeta/k$ is the characteristic timescale of the trap. For small values of the time the MSD grows quadratically in time, and for $\alpha=0$ it is possible to obtain the long-time self diffusivity of an active swimmer: $D^{swim}=\frac{1}{2}\lim_{t\to\infty}d(\langle x(t)x(t)\rangle_{\alpha=0})/dt=U_0^2\tau_R/2$. Most importantly for times long compared to both $\tau_R$ and $\tau_{trap}$ the MSD becomes a constant $$\lim_{t\to\infty}\frac{\langle x(t)x(t)\rangle}{(U_0\tau_R)^2} = \frac{1}{\alpha(1+\alpha)}\left(\frac{I}{2}\right). \quad (34)$$

Multiplying Eq. 32 by nx and taking the average it is possible to obtain $$\sigma^{swim} \equiv -n\langle xF^{swim}\rangle = -\frac{n\zeta}{2}\frac{d\langle xx\rangle}{dt} + n\langle xF^{trap}\rangle, \quad (35)$$

where the definition of the swim stress $\sigma^{swim} \equiv -n \langle xF^{swim} \rangle$ was used and n is the number density of swimmers, see Ref. [2]. As showed in Eq. 34, for times long compared to both $\tau_R$ and $\tau_{trap}$ the MSD becomes a constant and its time derivative is zero:

$$\frac{d}{dt}\left(\lim_{t\to\infty} \langle x(t)x(t)\rangle\right) = 0.$$

Therefore the swim pressure $\Pi^{swim} = \mathrm{tr}\sigma^{swim}/2$ (in 2 D) is given by $$\prod{}^{swim} = -\frac{n}{2}\langle x \cdot F^{trap}\rangle, \quad (36)$$

which is a general result valid in principle for any trapping force $F^{trap}$. For a harmonic trap $F^{trap} = -kx$, the swim pressure can be determined from a simple MSD measurement as given in Eq. 29. Substituting Eq. 34 into Eq. 29, it is possible to obtain the theoretical result $\Pi^{swim}/(n\zeta U_0^2 \tau_R/2) = (1+\alpha)^{-1}$ as given in Eq. 30 of the main text.

For values of time not large compared to $\tau_R$ and $\tau_{trap}$, the slope of MSD is not zero and the swim pressure has a transient start up period:

$$\frac{\prod{}^{swim}}{n\zeta U_0^2 \tau_R/2} = \frac{1}{1+\alpha}\left(1 - e^{-\left(\frac{1}{\tau_R} + \frac{1}{\tau_{trap}}\right)t}\right). \quad (37)$$

This expression is exact and is valid for all times t. Upon taking times $t \gg \tau_R, t \gg \tau_{trap} = \zeta/k$, this result agrees with Eq. 30. Therefore measuring the MSD $\langle xx \rangle$ is an easy and simple method to quantify the swim pressure in an experimental system.

For nonlinear traps with a general form of $F^{trap}$, it is possible to evaluate Eq. 36 directly. For a Gaussian trap with stiffness k and width w, $$F^{trap}(r) = -kr\exp\left(-2\left(\frac{r}{w}\right)^2\right)\hat{r},$$

it is possible to obtain $$\prod{}^{swim} = \frac{n}{2}\left\langle kr^2 \exp\left(-2\left(\frac{r}{w}\right)^2\right)\right\rangle. \quad (38)$$

For a large well (large w), the trapping force becomes harmonic and it is possible to obtain again the previous result in Eq. 29, where the MSD $\langle r^2 \rangle$ gives the swim pressure. However in general the proper correlation $$\left\langle kr^2 \exp\left(-2\left(\frac{r}{w}\right)^2\right)\right\rangle$$

must be computer as given in Eq. 38.

In some embodiments, the self-propelled body may be a bacterium, an archaea, a protist, a self-propelled living microorganisms, a molecular motor, a synthetic colloidal particle, a Janus nanoparticle, a Janus microparticle, a self-propelled algae, flagellate, or ciliate, a cytoskeletal motor, a polymerization motor, a rotary motor, a nucleic acid motor, or a synthetic molecular motor. The self-propelled body may be, for example, chemotactic, phototactic, gyrotactic, or thermotactic. The self-propelled body may, for example, respond to an external field such as a magnetic field, a gravitational field, an electric field, an optical field, an acoustic field, a light intensity field, a thermal field, a chemical concentration field, a nutrient concentration field, a toxin concentration field.

Figure 15:
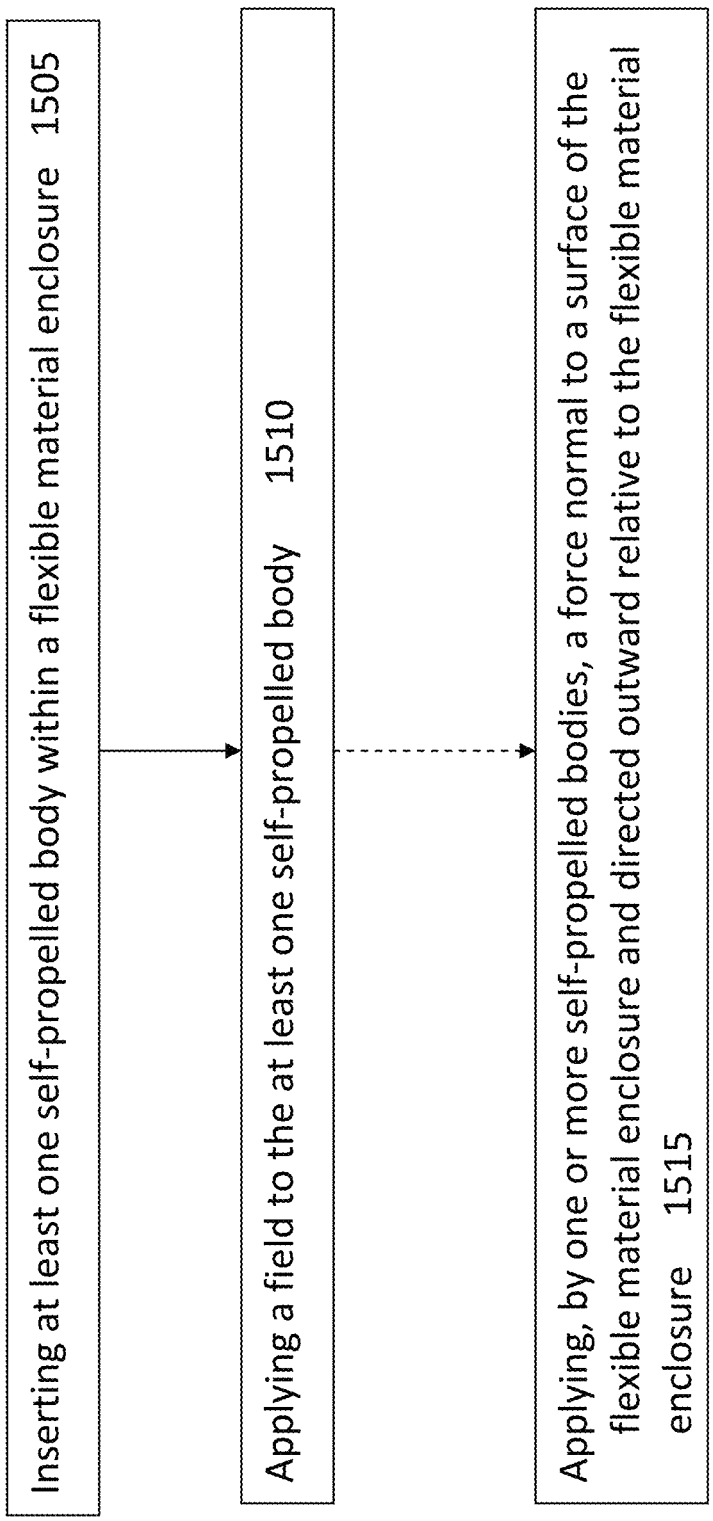
FIG. 15 illustrates an embodiment method of the present disclosure.

FIG. 15 illustrates an embodiment method of the present disclosure, comprising inserting at least one self-propelled body within a flexible material enclosure (1505); and applying a field to the at least one self-propelled body (1510), wherein the intensity and direction of the field is determined according to a desired behavior of the at least one self-propelled body. In some embodiments, applying a field causes the application of a force, by the one or more self-propelled bodies, normal to a surface of the flexible material enclosure (1515) and directed outward relative to the flexible material enclosure.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

1. S. Ramaswamy, Annu Rev. Condens. Matter Phys., 2010, 1, 323-345.
2. S. C. Takatori, W. Yan and J. F. Brady, Phys. Rev. Lett., 2014, 113, 028103.
3. J. Adler, Science, 1966, 153, 708-716.
4. J. Armitage and K. Hellingwerf, Photosynth. Res., 2003, 76, 145-155.

5. R. Blakemore, Science, 1975, 190, 377-379.
6. D. Hader, R. Hemmersbach and M. Lebert, Gravity and the Behavior of Unicellular Organisms, Cambridge University Press, Cambridge, United Kingdom, 2005.
7. M. Doi, Soft Matter Physics, Oxford University Press, Oxford, United Kingdom, 2013.
8. D. S. Fudge, T. Winegard, R. H. Ewoldt, D. Beriault, L. Szewciw and G. H. McKinley, Integr. Comp. Biol., 2009, 49, 32-39.
9. S. K. Lai, Y.-Y. Wang, D. Wirtz and J. Hanes, Adv. Drug Delivery Rev., 2009, 61, 86-100.
10. D. Saintillan and M. J. Shelley, Phys. Fluids, 2008, 20, 123304-123315.
11. T. Ishikawa, M. P. Simmonds and T. J. Pedley, J. Fluid Mech., 2006, 568, 119-160.
12. I. Theurkauff, C. Cottin-Bizonne, J. Palacci, C. Ybert and L. Bocquet, Phys. Rev. Lett., 2012, 108, 268303.
13. J. Palacci, S. Sacanna, A. P. Steinberg, D. J. Pine and P. M. Chaikin, Science, 2013, 339, 936-940.
14. H. Brenner, J. Colloid Interface Sci., 1979, 71, 189-208.
15. Y. Almog and I. Frankel, J. Colloid Interface Sci., 1993, 157, 60-71.
16. M. A. Bees, N. A. Hill and T. J. Pedley, J. Math. Biol., 1998, 36, 269-298.
17. A. Manela and I. Frankel, J. Fluid Mech., 2003, 490, 99-127.
18. T. J. Pedley and J. O. Kessler, J. Fluid Mech., 1990, 212, 155-182.
19. R. N. Bearon, A. L. Hazel and G. J. Thorn, J. Fluid Mech., 2011, 680, 602-635.
20. R. N. Bearon, M. A. Bees and O. A. Croze, Phys. Fluids, 2012, 24, 121902-121920.
21. M. Demir and H. Salman, Biophys. J., 2012, 103, 1683-1690.
22. R. R. Vuppula, M. S. Tirumkudulu and K. V. Venkatesh, Phys. Biol., 2010, 7, 026007.
23. R. N. Zia and J. F. Brady, J. Fluid Mech., 2010, 658, 188-210.
24. U. M. Cordova-Figueroa and J. F. Brady, Phys. Rev. Lett., 2008, 100, 158303.
25. H. Brenner and D. Edwards, Macrotransport Processes, Butterworth-Heinemann Limited, 1993.
26. H. Brenner and D. W. Condiff, J. Colloid Interface Sci., 1974, 47, 199-264.
27. H. Brenner, Chem. Eng. Sci., 1964, 19, 631-651.
28. D. A. Beard and T. Schlick, Biophys. J., 2003, 85, 2973-2976.
29. J. Toner, Y. Tu and S. Ramaswamy, Ann. Phys., 2005, 318, 170-244.
30. A. Snezhko and I. S. Aranson, Nat. Mater., 2011, 10, 698-703.
31. M. V. Sapozhnikov, Y. V. Tolmachev, I. S. Aranson and W. K. Kwok, Phys. Rev. Lett., 2003, 90, 114301.
32. M. E. Leunissen, H. R. Vutukuri and A. van Blaaderen, Adv. Mater., 2009, 21, 3116-3120.
33. Takatori, S. C & Brady, J. F. (2014) Swim stress, motion, and deformation of active matter: effect of an external field. Soft Matter 10, 9433-9445.
34. Takatori, S. C & Brady, J. F. (2015) Towards a thermodynamics of active matter. Phys Rev E 91, 032117.
35. Fily, Y, Henkes, S, & Marchetti, M. C. (2014) Freezing and phase separation of self-propelled disks. Soft Matter 10, 2132-2140.
36. Solon, A. P, Stenhammar, J, Wittkowski, R, Kardar, M, Kafri, Y, Cates, M. E, & Tailleur, J. (2015) Pressure and phase equilibria in interacting active Brownian spheres. Phys Rev Lett 114, 198301.
37. Mallory, S. A, Saric, A, Valeriani, C, & Cacciuto, A. (2014) Anomalous thermomechanical properties of a self-propelled colloidal fluid. Phys Rev E 89, 052303.
38. Ginot, F, Theurkauff, I, Levis, D, Ybert, C, Bocquet, L, Berthier, L, & Cottin-Bizonne, C. (2015) Nonequilibrium equation of state in suspensions of active colloids. Phys Rev X 5, 011004.
39. Wang, Z, Chen, H.-Y, Sheng, Y.-J, & Tsao, H.-K. (2014) Diffusion, sedimentation equilibrium, and harmonic trapping of run-and-tumble nanoswimmers. Soft Matter 10, 3209-3217.
40. Nash, R. W, Adhikari, R, Tailleur, J, & Cates, M. E. (2010) Run-and-tumble particles with hydrodynamics: Sedimentation, trapping, and upstream swimming. Phys Rev Lett 104, 258101.
41. Tailleur, J & Cates, M. E. (2009) Sedimentation, trapping, and rectification of dilute bacteria. Europhys Lett 86, 60002.
42. Chattopadhyay, S, Moldovan, R, Yeung, C, & Wu, X. L. (2006) Swimming efficiency of bacterium *Escherichia coli*. Proc Natl Acad Sci U.S.A 103, 13712-13717.
43. Howse, J. R, Jones, R. A. L, Ryan, A. J, Gough, T, Vafabakhsh, R, & Golestanian, R. (2007) Self-motile colloidal particles: from directed propulsion to random walk. Phys Rev Lett 99, 048102.
44. Lee, J, Teh, S.-Y, Lee, A, Kim, H. H, Lee, C, & Shung, K. K. (2010) Transverse acoustic trapping using a Gaussian focused ultrasound. Ultrasound Med Biol 36, 350-355.
45. Crocker, J. C & Grier, D. G. (1996) Methods of digital video microscopy for colloidal studies. J Colloid Interface Sci 179, 298-310.
46. Foss, D. R & Brady, J. F. (2000) Brownian dynamics simulation of hard-sphere colloidal dispersions. J Rheol 44, 629-651.
47. Heyes, D. M & Melrose, J. R. (1993) Brownian dynamics simulations of model hard-sphere suspensions. J Non-Newtonian Fluid Mech 46, 1-28.

What is claimed is:

1. A method comprising:
   inserting a plurality of self-propelled bodies within a flexible material enclosure, the flexible material enclosure being permeable to a solvent;
   applying a field to the plurality of self-propelled bodies while in the solvent, thereby applying a force to the flexible material enclosure, by the plurality of self-propelled bodies, the force being normal to a surface of the flexible material enclosure and directed outward relative to the flexible material enclosure;
   translating the flexible material enclosure based on the force; and
   rotating the applied field with a rotation rate of value $\Omega_{ext}$, thus inducing an angular velocity in the plurality of self-propelled bodies of value $\Omega_c$,
   wherein rotating the applied field comprises:
   applying a rotation ratio $\Omega_{ext}/\Omega_c \gg 1$, the rotation ratio being selected such that the flexible material enclosure changes shape while its translational velocity direction changes stepwise.

2. The method of claim 1, wherein rotating the applied field is by 90 degrees.

3. The method of claim 1, wherein the plurality of self-propelled bodies comprises at least one of: bacteria, archaea, protists, molecular motors, synthetic colloidal particles, Janus nanoparticles, and Janus microparticles.

4. The method of claim 1, further comprising calculating an estimated speed for the plurality of self-propelled bodies based on a porosity and geometry of the flexible material enclosure, a Stoke drag parameter, and a Langevin parameter.

\* \* \* \* \*